United States Patent
Tsujino et al.

(10) Patent No.: US 7,469,197 B2
(45) Date of Patent: Dec. 23, 2008

(54) MEASUREMENT DATA COLLECTION METHOD AND PORTABLE INFORMATION DEVICE

(75) Inventors: Daisuke Tsujino, Tokyo (JP); Yasuhiro Nishide, Tokyo (JP); Jun Yamazaki, Tokyo (JP); Hirohisa Kusuda, Tokyo (JP)

(73) Assignee: Vodafone K.K., Tokyo (JP)

( * ) Notice: Subject to any disclaimer, the term of this patent is extended or adjusted under 35 U.S.C. 154(b) by 0 days.

(21) Appl. No.: 11/654,686

(22) Filed: Jan. 18, 2007

(65) Prior Publication Data

US 2007/0192055 A1  Aug. 16, 2007

Related U.S. Application Data

(63) Continuation of application No. PCT/JP2005/014879, filed on Aug. 9, 2005.

(30) Foreign Application Priority Data

| Aug. 9, 2004 | (JP) | ............................ 2004-232231 |
| Nov. 30, 2004 | (JP) | ............................ 2004-346267 |

(51) Int. Cl.
*G01C 17/00* (2006.01)
(52) U.S. Cl. .................. 702/127; 702/150; 702/141; 702/152; 702/153; 702/189
(58) Field of Classification Search ............ 702/57, 702/150, 152, 153, 189
See application file for complete search history.

(56) References Cited

U.S. PATENT DOCUMENTS

| 2002/0173295 | A1 | 11/2002 | Nykanen et al. |
| 2004/0002958 | A1 | 1/2004 | Seshadri et al. |
| 2004/0068481 | A1 | 4/2004 | Seshadri et al. |
| 2004/0078153 | A1* | 4/2004 | Bartone et al. ................. 702/57 |

FOREIGN PATENT DOCUMENTS

| CN | 1509561 A | 6/2004 |
| CN | 1525687 A | 9/2004 |
| EP | 1 486 897 A1 | 12/2004 |
| JP | 2001-216315 | 8/2001 |
| JP | 2002-164987 | 6/2002 |
| JP | 2004-259261 | 9/2004 |
| JP | 2004-535000 | 11/2004 |
| KR | 10-2004-0076583 | 9/2004 |
| WO | WO 02/093877 A1 | 11/2002 |

* cited by examiner

*Primary Examiner*—Tung S Lau
*Assistant Examiner*—Sujoy K Kundu
(74) *Attorney, Agent, or Firm*—Kratz, Quintos & Hanson, LLP

(57) ABSTRACT

A data collection unit (37) collects measurement data which satisfies a data collection condition designated by an application (33) and stores the measurement data in a temporary storage area (24). The data report unit (38) reports, to the application (33), measurement data which is stored in the temporary storage area (24) and satisfies a data report condition designated by the application (33). As a result, the load on the application 33 using a measurement result by a sensor in measurement data acquisition is reduced.

56 Claims, 22 Drawing Sheets

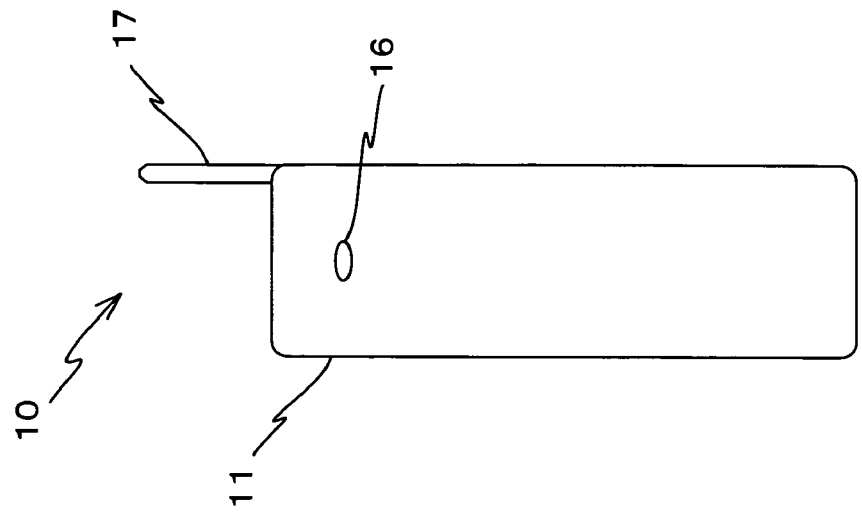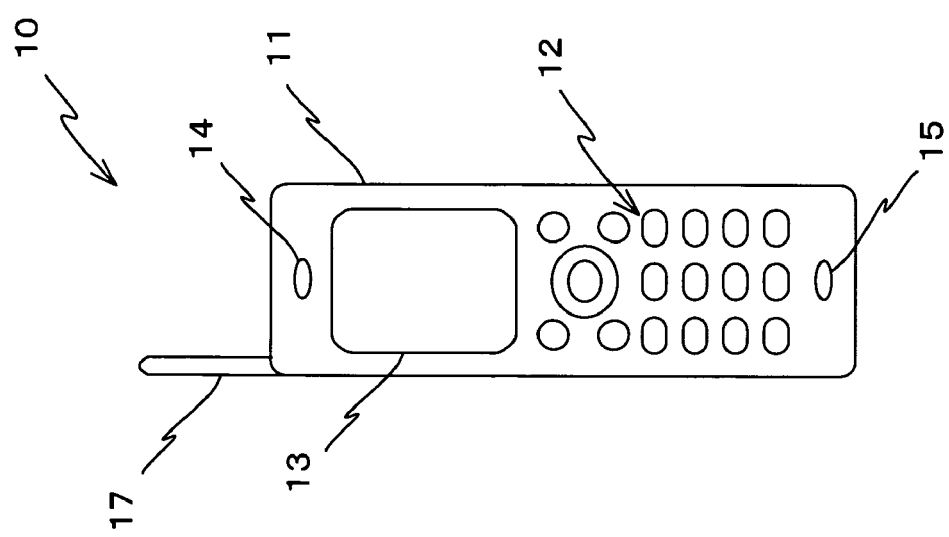

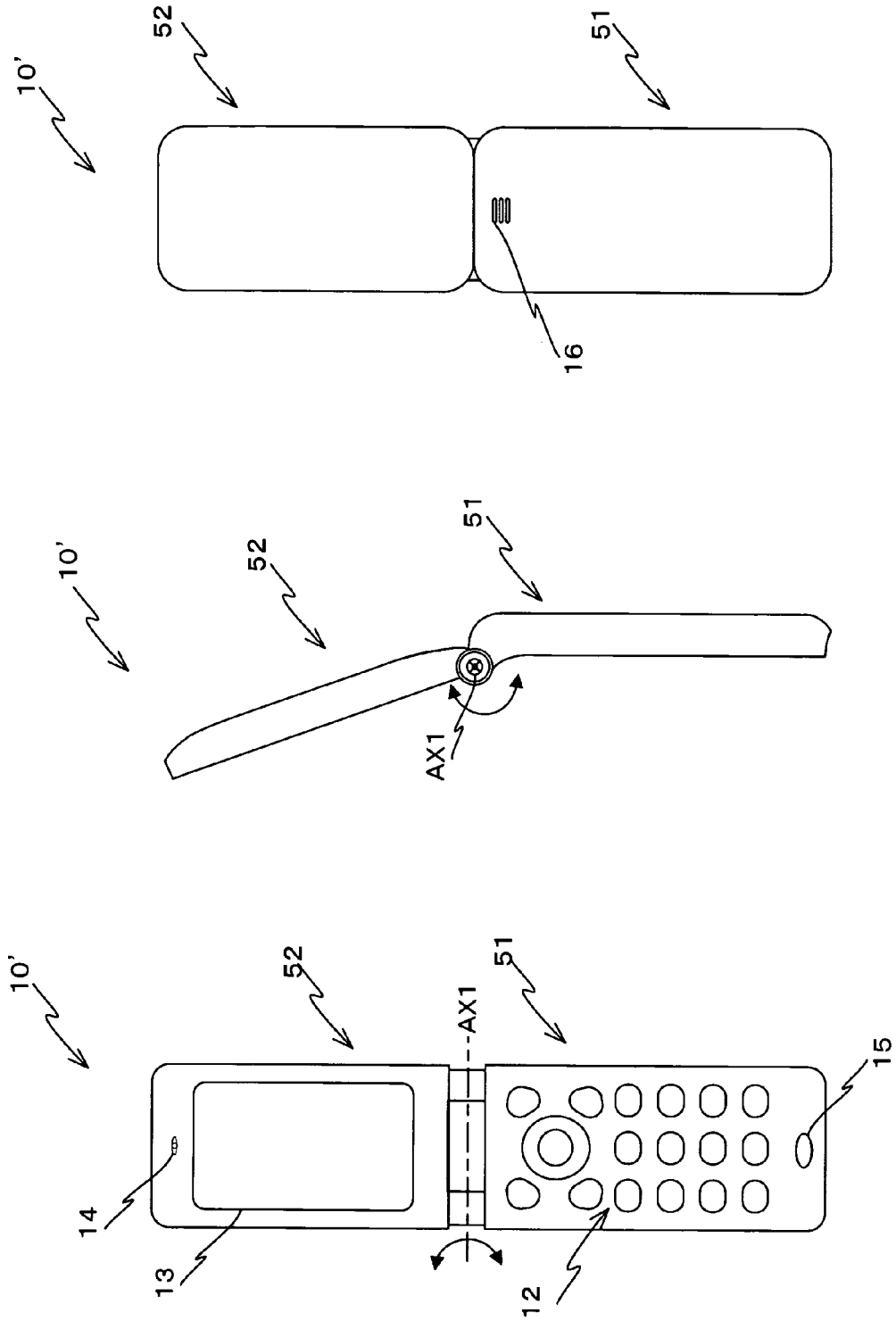

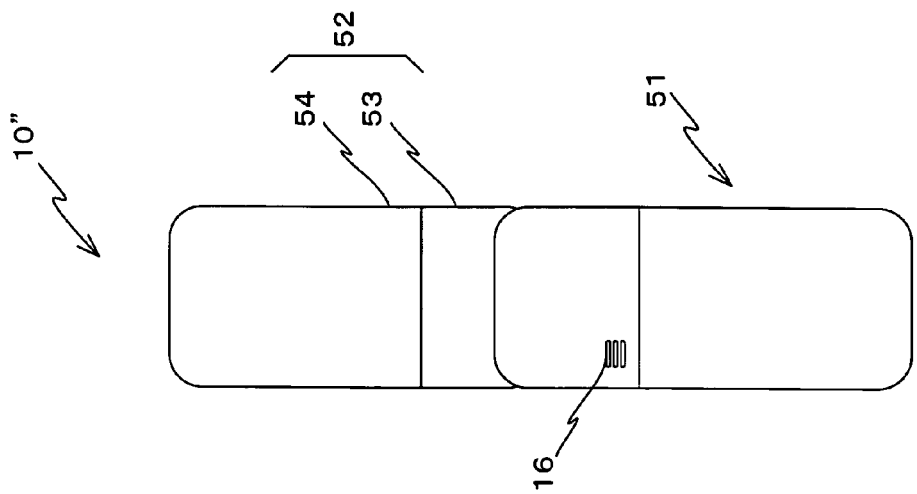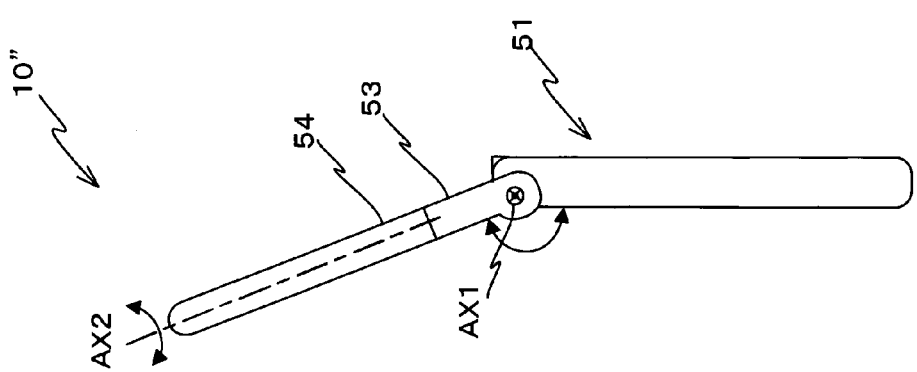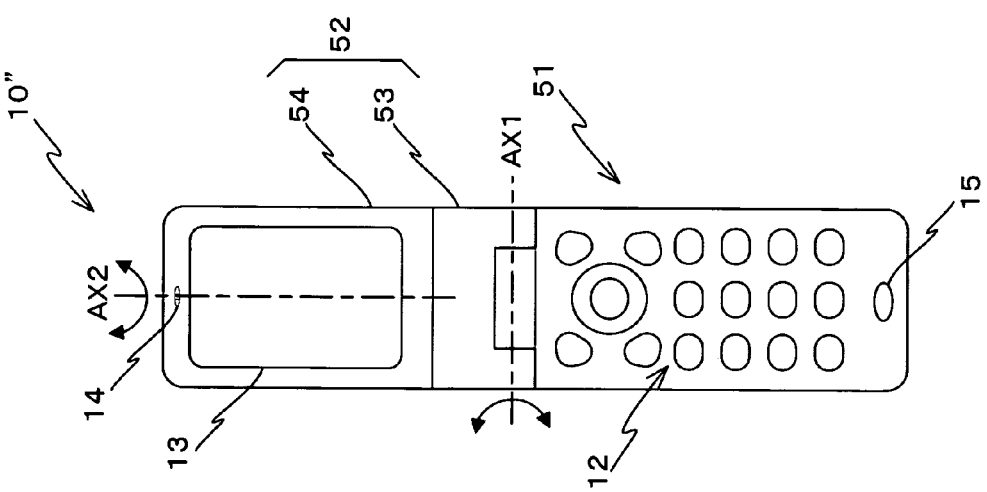

MEASUREMENT DATA COLLECTION METHOD AND PORTABLE INFORMATION DEVICE

RELATED APPLICATION

This is a continuation application of the international patent application No. PCT/JP2005/014879 filed with Application date: Aug. 9, 2005. The present application is based on, and claims priority from, J.P. Application 2004-232231, filed on Aug. 9, 2004, and J.P. Application 2004-346267, filed on Nov. 30, 2004, the disclosure of which is hereby incorporated by reference herein its entirety.

BACKGROUND OF THE INVENTION

The present invention relates to a measurement data collection method and a portable information device and, more particularly, to a measurement data collection method of collecting measurement data from a sensor and notifying an application which uses the measurement data of it and a portable information device which uses the measurement data collection method.

BACKGROUND ART

Conventionally, portable information devices represented by cellular phone devices, which are capable of operating while moving, are widely used. Technologies of such portable information devices and, more particularly, cellular phone devices are progressing remarkably, and various kinds of applications including games are also installed.

A portable information device generally incorporates a current position measuring function. There is also a proposal that a device includes a sensor to measure the acceleration acting on it and its attitude angle, and measurement data obtained by the sensor is used in an application. For example, there is proposed a cellular phone device which comprises a sensor to measure the acceleration or angular velocity and displays, on a display means, data about the acceleration or angular velocity measured by the sensor (See patent reference 1: to be referred to as "prior art 1" hereinafter).

There is proposed another cellular phone device which comprises a sensor to measure the acceleration, obtains the device's moving locus by using the data of acceleration measured by the sensor, and recognizes the moving locus as an input text (See patent reference 2: to be referred to as "prior art 2" hereinafter).

Still another cellular phone device has been proposed, which comprises a geomagnetic sensor and can input a numerical value corresponding to a specific azimuth by directing the cellular phone main body to the specific azimuth (See patent reference 3: to be referred to as "prior art 3" hereinafter).

[Patent Reference 1] Japanese Patent publication No. 2001-272413

[Patent Reference 2] Japanese Patent publication No. 2002-169645

[Patent Reference 3] Japanese Patent publication No. 2003-111142

SUMMARY OF INVENTION

Prior arts 1 to 3 described above disclose excellent techniques of using a measurement result obtained by a sensor in a cellular phone device. The references which disclose the techniques of prior arts 1 to 3 contain no mention of a method of collecting measurement data by the sensor. However, it seems that an application which uses data corresponding to the measurement result by the sensor collects the measurement data in a form adapted to the use. For this purpose, the application probably executes processing of acquiring desired measurement data while directly controlling the sensor.

In such measurement data acquisition, some kinds of applications only need to acquire one measurement data at a desired point of time, and other types of applications should acquire a plurality of measurement data reported from the sensor time-serially. Alternatively, certain kinds of applications want to acquire measurement data that satisfy a desired condition such as a collection period or data value range.

It produces a heavy load for the application to receive raw measurement data from the sensor and process it to acquire desired measurement data. Hence, a technique capable of reducing the load on the application in acquiring want measurement data has been desired earnestly.

The present invention has been made in consideration of the above situations, and has as its object to provide a measurement data collection method capable of reducing load on an application which uses measurement data from a sensor.

It is another object of the present invention to provide a portable information device capable of executing an application which uses measurement data from a sensor while reducing load on the application.

According to the first aspect of the present invention, there is provided a measurement data collection method for collecting measurement data corresponding to a measurement result from a sensor and notifying an application operating in a portable information device of the measurement data, the sensor being arranged in the portable information device and measuring attitude angles about three axial directions of the portable information device, which are perpendicular to each other, and accelerations in at least two of the three axial directions; the method comprising: the condition designation step of causing the application to designate a data collection condition as a condition of measurement data to be collected; the data collection step of collecting measurement data which satisfies the data collection condition and storing the measurement data in temporary storage means; and the data report step of reporting, to the application, measurement data which is stored in the temporary storage means and satisfies a data report condition designated by the application as condition of measurement data to be reported to the application.

"Measurement data" is not raw measurement data which is directly output from the sensor. "Measurement data" indicates data having a data format to notify the application, which is obtained by executing offset correction and physical quantity conversion of angles and accelerations for raw measurement data as needed. In this specification, the term "measurement data" is used in this sense.

In this measurement data collection method, first by, in the condition designation step, the application designates a data collection condition as a condition of measurement data to be collected in measurement data from the sensor. Next, in the data collection step, measurement data which satisfies the data collection condition is collected and stored in temporary storage means. In the data report step, measurement data which is stored in the temporary storage means and satisfies a data report condition designated by the application is reported to the application.

The data collection condition and data report condition are separately defined, because they are either identical or different. For example, when the application issues a data request, a predetermined number of latest measurement data among measurement data collected until the point of time of the data request, should be reported to the application, the data collection condition and data report condition are different.

As a result, the application only needs to designate the data collection condition to collect measurement data for itself.

The application need not execute actual data collection. Only measurement data the application wants to acquire are reported to the application. Hence, according to the measurement data collection method of the present invention, the application can acquire desired measurement data while reducing the load on the application.

The measurement data collection method of the present invention can further comprise the data request step of causing the application to issue a data request with the designated data report condition. The data report step can be executed in response to the data request.

The data collection condition may be a collection period. In this case, after designation of the data collection condition, every time the collection period elapses, measurement data is collected and stored in the temporary storage means.

When the data collection condition is the collection period, the data which satisfies the data report condition may be measurement data which is stored latest in the temporary storage means before the data request. In this case, the application can acquire the latest measurement data which satisfies the data collection condition at the point of time of the data request.

When the data collection condition is the collection period, the measurement data which satisfies the data report condition can be measurement data equal in number to the number of report data designated by the application in a reverse chronological order from a point of time of the data request. In this case, the application may acquire recently collected measurement data equal in number to the desired number of reportable data.

The method can further comprise the number-of-reportable-data notification step of notifying the application of the number of reportable data, when a notification request of the number of reportable data including measurement data which are stored in the temporary storage means and exist in the temporary storage means is received from the application between a preceding point of time of the data request and a current point of time. In this case, the application can know the number of reportable data in the temporary storage means before the data request. Accordingly, when reportable data equal to or more than a desired number are confirmed, and then a data request is issued while designating the desired number as the data report condition, the application can reliably acquire the desired number of measurement data.

When the data collection condition is the collection period, the measurement data which satisfies the data report condition can be, of reportable data which are measurement data stored in the temporary storage means later than measurement data reported in response to a preceding data request and existing in the temporary storage means, measurement data equal in number to the number of reportable data designated by the application in a chronological order from the oldest data. In this case, the temporary storage means can be used as FIFO (First-In Fast-Out) storage means.

The method can further comprise the number-of-reportable-data notification step of notifying the application of the number of reportable data, when a notification request of the number of reportable data is received from the application. In this case, the application can know the number of reportable data in the temporary storage means before the data request. Accordingly, when reportable data equal to or more than a desired number are confirmed, and then a data request is issued while designating the desired number as the data report condition, the application can reliably acquire the desired number of measurement data.

In the measurement data collection method of the present invention, in the condition designation step, the data report condition can additionally be designated. In this case, in the condition designation step, the application designates both of the data collection condition and the data report condition.

The data report step can be executed immediately after the measurement data which satisfies the data collection condition is newly stored in the temporary storage means, when the following requirements are satisfied: 1) the measurement data which satisfies the data collection condition can be measurement data corresponding to a measurement result which is noticed from the sensor for the first time after designation of the data collection condition and the data report condition; 2) the measurement data which satisfies the data report condition can be measurement data which satisfies the data collection condition. In this case, after the data collection condition and the data report condition are designated by the application, measurement data corresponding to the measurement result sent from the sensor for the first time is collected and immediately reported to the application.

In the data report step, every time the measurement data which satisfies the data collection condition is newly stored in the temporary storage means, the stored measurement data can immediately be reported to the application, when the following requirements are satisfied: 1) the data collection condition can include threshold information indicating a data value range which is a range of a value of measurement data to be collected and one of a collection time and the number of collection data after designation of the data collection condition; 2) the measurement data which satisfies the data report condition can be measurement data which satisfies the data collection condition. In this case, measurement data in the data value range defined by the threshold information is collected and immediately reported to the application during a period after the data collection condition and the data report condition are designated by the application in the condition designation step until one of the forward limit time and the maximum number of collection data, which is designated by a parameter in the data collection condition, is reached.

When the data collection condition and the data report condition are designated in the condition designation step, the method can further comprise the data request step of causing the application to issue a data request. The data report step can be executed in response to the data request. In this case, measurement data necessary for the application is reported in response to the data request issued by the application when it desires measurement data. For this reason, the application can acquire necessary measurement data at a necessary timing.

The data collection condition can include a collection period. The measurement data which satisfies the data report condition can be one of measurement data collected within a limit time in a reverse chronological order from a point of time of the data request and measurement data within the maximum number of report data in the reverse chronological order from the point of time of the data request. In this case, after designation of the data collection condition and the data report condition, every time the collection period elapses, measurement data is collected and stored in the temporary storage means in the data collection step. Measurement data which satisfies the data report condition is then reported to the application.

In this case, the method may further comprise the number-of-reportable-data notification step of notifying the application of the number of reportable data, when a notification request of the number of reportable data including measurement data which are stored in the temporary storage means and exist in the temporary storage means, is received from the application between a preceding point of time of the data request and a current point of time.

When the data collection condition and the data report condition are designed in the condition designation step, the method may further comprise the data collection completion report step of reporting data collection completion to the application, when storage of the measurement data which satisfies the data collection condition in the temporary storage means is ended. The application which has received the report of the data collection completion may issue the data request in the data request step. In this case, the data collection completion is reported to the application in the data collection completion report step. For this reason, the application can recognize the data collection completion without monitoring the data collection completion. The application which has recognized the data collection completion by the data collection completion report can acquire necessary measurement data at a timing convenient for itself.

The data collection condition can include a collection period and either a collection time or the number of collection data. The measurement data which satisfies the data report condition can be measurement data which satisfies the data collection condition. In this case, after designation both of the data collection condition and the data report condition, every time the collection period elapses, measurement data is collected and stored in the temporary storage means in the data collection step. When collection of measurement data which satisfies the data collection condition and storage in the temporary storage means are completed, the application is notified of the data collection completion in the data collection completion report step. When the application which has received the report issues a data request, the measurement data stored in the temporary storage means are reported to the application in the data report step.

The data collection condition can include a collection period, start threshold information indicating a range of a value of measurement data as a condition for a start of data collection, and either a collection time or the number of collection data after designation of the data collection condition. The measurement data which satisfies the data report condition can be measurement data which satisfies the data collection condition. In this case, when measurement data in the data value range defined by the start threshold information is generated, the measurement data is collected and stored in the temporary storage means every time the collection period elapses until the collection time or the number of collection data is reached. When collection of measurement data which satisfies the data collection condition and storage in the temporary storage means are completed, the application is notified of the data collection completion in the data collection completion report step. When the application which has received the report issues a data request, the measurement data stored in the temporary storage means are reported to the application in the data report step.

The data collection condition can include a collection period and end threshold information indicating a range of a value of measurement data as a condition for an end of data collection. The measurement data which satisfies the data report condition may be one of measurement data collected within a limit time in a reverse chronological order from a point of the end of data collection and measurement data within the maximum number of data in the reverse chronological order from the point of time of the end of data collection.

In this case, after designation of the data collection condition and the data report condition, every time the collection period elapses, measurement data is collected and stored in the temporary storage means in the data collection step. When measurement data in the data value range defined by the end threshold information is generated, the collection operation is ended. When collection of measurement data which satisfies the data collection condition and storage in the temporary storage means are completed, the application is notified of the data collection completion in the data collection completion report step. When the application which has received the report issues a data request, of the measurement data stored in the temporary storage means, measurement event data which satisfy the data report condition are reported to the application in the data report step.

The threshold information can contain a threshold value and information representing whether the value of measurement data to be collected is larger or smaller than the threshold value. In this case, the range of the value of measurement data desired by the application can finely be designated.

When the measurement data contains a plurality of measurement results, threshold information can independently be designated for each of the plurality of measurement results.

In the measurement data collection method of the present invention, when a plurality of data collection conditions are designated, and data collection must be executed at a plurality of different collection periods, in the data collection step, the measurement data can be stored in the temporary storage means at a time interval corresponding to a value of a greatest common divisor related to values of the plurality of data collection periods. In this case, even when a plurality of data collection conditions having different parameter values of periods are designated, all measurement data to be collected can be collected and stored in the temporary storage means.

In the measurement data collection method of the present invention, when the application is abnormally terminated during execution of the data collection step, a basic processing part to manage the application can issue an instruction to stop execution of the data collection step. In this case, even when the application is abnormally terminated without ending the data collection operation after the start of the data collection operation, the basic processing part stops the data collection step. Hence, continuous execution of unnecessary data collection can be prevented.

The measurement data collection method of the present invention can further comprise the sensor operation start instruction event detection step of detecting occurrence of a sensor operation start instruction event to instruct a start of an operation of the sensor, and the sensor operation start step of starting the operation of the sensor. In this case, the operation of the sensor is started in the sensor operation start step in response to detection of the sensor operation start instruction event in the sensor operation start instruction event detection step. Hence, the operation of the sensor can appropriately be started when it is assumed in advance that the operation start of the sensor is necessary or when the user determines that the operation start of the sensor is necessary.

The sensor operation start instruction event can include at least one event selected from the group consisting of an operation start request of the sensor from the application, activation of the application, a key operation to instruct to start the operation of the sensor, voice input to instruct to start the operation of the sensor, arrival of time at which the sensor should start the operation, and detection of a state to make the sensor operate depending on the shape of the device in which the sensor is implemented. The "arrival of time" includes arrival of time when an elapse of a predetermined time from a point of time is designated at the point of time, and the predetermined time elapses, in addition to arrival of time explicitly designated in advance. In this specification, the term "arrival of time" is used in this sense.

When the measurement data collection method of the present invention is used in a mobile communication terminal device, the sensor operation start instruction event can include a call reception event. In this case, for example, an off-hook operation which is normally executed by the key operation after arrival can be executed by only causing the mobile communication terminal device to execute a motion in a predetermined form.

The measurement data collection method of the present invention can further comprise the sensor operation stop instruction event detection step of detecting occurrence of a sensor operation stop instruction event to instruct a stop of an operation of the sensor, and the sensor operation stop step of stopping the operation of the sensor. In this case, the operation of the sensor is stopped in the sensor operation stop step in response to detection of the sensor operation stop instruction event in the sensor operation stop instruction event detection step. Hence, the operation of the sensor can appropriately be stopped when it is assumed in advance or the user determines that the operation of the sensor is unnecessary. As a consequence, power consumption by unnecessary sensor operation can be prevented.

The sensor operation stop instruction event can include at least one event selected from the group consisting of an operation stop request of the sensor from the application, stop of the application, a key operation to instruct to stop the operation of the sensor, voice input to instruct to stop the operation of the sensor, arrival of time at which the sensor should stop the operation, and detection of a state to make the sensor stop the operation depending on the shape of the device in which the sensor is implemented.

When the measurement data collection method of the present invention is used in a mobile communication terminal device, the sensor operation stop instruction event can include a call reception event. In this case, for example, when the sensor is not used in call reception processing, the operation of the sensor can be stopped before call reception processing with a high priority.

According to the second aspect of the present invention, there is provided a portable information device comprising: a sensor which measures attitude angles about three axial directions perpendicular to each other and accelerations in at least two of the three axial directions; temporary storage means for temporarily storing measurement data; data collection means for collecting measurement data which satisfies a data collection condition designated by an application as a condition of data to be collected in the measurement data from the sensor and storing the measurement data in the temporary storage means; and data report means for notifying the application of the measurement data which is stored in the temporary storage means and satisfies a data report condition designated by the application.

In the portable information device, the data collection means collects measurement data which satisfies the data collection condition designated by the application and stores the measurement data in the temporary storage means. The data report means notifies the application of data which is stored in the temporary storage means and satisfies the data report condition.

That is, the portable information device of the present invention can collect measurement data and report, to the application, measurement data to be reported by using the above-described measurement data collection method of the present invention. According to the portable information device of the present invention, the application can acquire desired measurement data while reducing the load on the application.

In the portable information device of the present invention, the data report means can notify the application of the data which is stored in the temporary storage means and satisfies the data report condition in response to a data request issued by the application. In this case, the data report means notifies the application of necessary data in response to the data request issued by the application when measurement data is necessary. Hence, an environment to allow the application to acquire necessary measurement data when it is necessary can be provided.

The device can further comprise data collection completion report means for reporting data collection completion to the application, when storage of the measurement data which satisfies the data collection condition in the temporary storage means is ended. In this case, the data collection completion report means reports the data collection completion to the application. For this reason, an environment which allows the application to recognize the data collection completion without monitoring the data collection completion can be provided. As a result, the application which has recognized the data collection completion by the data collection completion report can acquire necessary measurement data at a timing convenient for itself.

The portable information device of the present invention may further comprise sensor operation start means for starting an operation of the sensor when occurrence of a sensor operation start event to instruct a start of the operation of the sensor is detected. In this case, the operation of the sensor can appropriately be started when it is assumed in advance or the user determines that the operation start of the sensor is necessary.

The sensor operation start instruction event can include at least one event selected from the group consisting of an operation start request of the sensor by the application, activation of the application, a key operation to instruct to start the operation of the sensor, voice input to instruct to start the operation of the sensor, arrival of time at which the sensor should start the operation, and detection of a state to make the sensor operate depending on the shape of the device in which the sensor is implemented.

The device can further comprise sensor operation stop means for stopping an operation of the sensor when occurrence of a sensor operation stop event to instruct a stop of the operation of the sensor is detected. In this case, the operation of the sensor can appropriately be stopped when it is assumed in advance or the user determines that the operation of the sensor is unnecessary. As a consequence, power consumption by unnecessary sensor operation can be prevented.

The sensor operation stop instruction event can include at least one event selected from the group consisting of an operation stop request of the sensor by the application, stop of the application, a key operation to instruct to stop the operation of the sensor, voice input to instruct to stop the operation of the sensor, arrival of time at which the sensor should stop the operation, and detection of a state to make the sensor stop the operation depending on the shape of the device in which the sensor is implemented.

When the sensor is arranged in a mobile communication terminal device, a call reception event can be used as the sensor operation start instruction event or sensor operation stop instruction event.

The portable information device of the present invention can further comprise a radio communication part to communicate with a base station of a mobile communication network. That is, the mobile terminal device of the present invention can be a mobile communication terminal device.

As described above, according to the measurement data collection method of the present invention, the load on the application which uses measurement data from the sensor can be reduced.

As described above, according to the portable information device of the present invention, the load on the application which uses measurement data from the sensor can be reduced.

BRIEF DESCRIPTION OF THE DRAWINGS

FIG. 1A is a view schematically showing the outer appearance of the front side of a cellular phone device according to an embodiment of the present invention;

FIG. 1B is a view schematically showing the outer appearance of the rear side of the cellular phone device according to the first embodiment of the present invention;

FIG. 21A is a front view showing the outer appearance of the cellular phone device; (1) for explaining a modification;

FIG. 21B is a right side view showing the outer appearance of the cellular phone device; (1) for explaining a modification;

FIG. 21C is a rear view showing the outer appearance of the cellular phone device; (1) for explaining a modification;

FIG. 22A is a front view showing the outer appearance of the cellular phone device; (2) for explaining another modification;

FIG. 22B is a right side view showing the outer appearance of the cellular phone device; (2) for explaining another modification; and FIG. 22C is a rear view showing the outer appearance of the cellular phone device; (2) for explaining another modification.

DETAILED DESCRIPTION

First Embodiment

Figure 2:
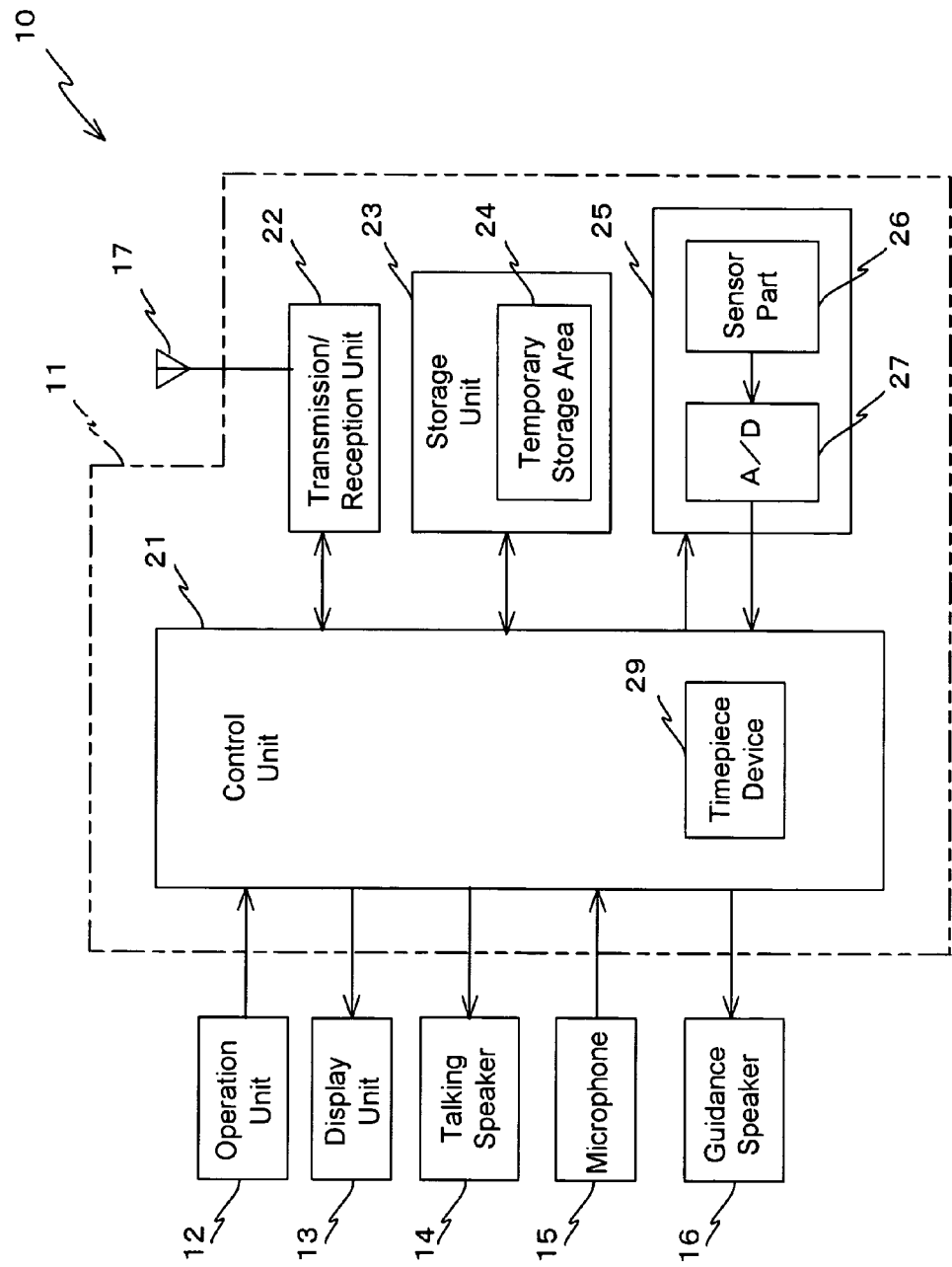
FIG. 2 is a functional block diagram for explaining the arrangement of the cellular phone device according to the first embodiment of the present invention.

The first embodiment of the present invention will be described below with reference to FIGS. 1A to 13. The same reference numerals denote the same or similar elements throughout the drawings, and a repetitive description thereof will be omitted.

<Device Arrangement>

FIGS. 1A and 1B schematically show the outer appearance of a cellular phone device 10 serving as a mobile terminal device. FIG. 1A is a front view showing the outer appearance of the cellular phone device 10. FIG. 1B is a rear view showing the outer appearance of the cellular phone device 10.

As comprehensively shown in FIGS. 1A and 1B, the cellular phone device 10 comprises (a) a cellular phone main body 11, (b) an operation unit 12 having a ten-key pad to input a telephone number and function keys to input various kinds of instructions for, e.g., operation mode switching to a control unit 21 (to be described later; FIG. 2), and (c) a display unit 13 having a liquid crystal display device to display an operation guide, operation status, and received message. The cellular phone device 10 also comprises (d) a talking speaker 14 which reproduces a voice signal sent from a communication partner in speech communication, (e) a microphone 15 to input sound in sound collection or voice in speech communication, (f) a guidance speaker 16 to generate a ringing tone or guidance sound, and (g) an antenna 17 to transmit/receive a radio signal to/from a base station.

As shown in FIG. 2, the cellular phone main body 11 incorporates (i) the control unit 21 which includes a timepiece device 29 and collectively controls the operation of the entire cellular phone device 10, (ii) a transmission/reception unit 22 which transmits/receives a radio signal to/from a base station through the antenna 17, and (iii) a storage unit 23 having a read only memory (ROM) device or random access memory (RAM) device to store programs to be executed by the control unit 21 and various kinds of data. The cellular phone main body 11 also incorporates (iv) a sensor unit 25 to measure the attitude angle of the cellular phone device 10 and an acceleration acting on it.

The storage unit 23 includes a temporary storage area 24 to temporarily store collected measurement data.

The sensor unit 25 comprises a sensor part 26 which detects the attitude angle of the cellular phone device 10 and an acceleration acting on it and outputs the data as an analog voltage signal, and an analog-to-digital (A/D) converter 27 which converts the voltage value of the voltage signal from the sensor part 26 into a digital value. The digital data output from the A/D converter 27 is sent to the control unit 21 as measurement data. The sensor unit 25 starts the operation in response to a measurement start instruction from the control unit 21 and stops the operation in response to a measurement stop instruction from the control unit 21.

The sensor part 26 defines the row direction of the matrix key array of the operation unit 12 as the X-axis and the column direction as the Y-axis. In this embodiment, the reference attitude is set such that the X-Y plane is parallel to the horizontal plane, and the +Y direction matches the true north. The sensor part 26 detects a rotation angle (pitch angle $\theta_X$) about the X-axis from the reference attitude, a rotation angle (roll angle $\theta_Y$) about the Y-axis, and a rotation angle (yaw angle $\theta_Z$) about the Z-axis parallel to the vertical direction. The sensor part 26 also detects an X-direction acceleration ($\alpha_X$) and a Y-direction acceleration ($\alpha_Y$). The sensor unit 25 notifies the control unit 21 of, as measurement data, a set of pitch angle $\theta_X$, roll angle $\theta_Y$, yaw angle $\theta_Z$, X-direction acceleration $\alpha_X$, and Y-direction acceleration $\alpha_Y$ detected at each measurement point.

Figure 3:
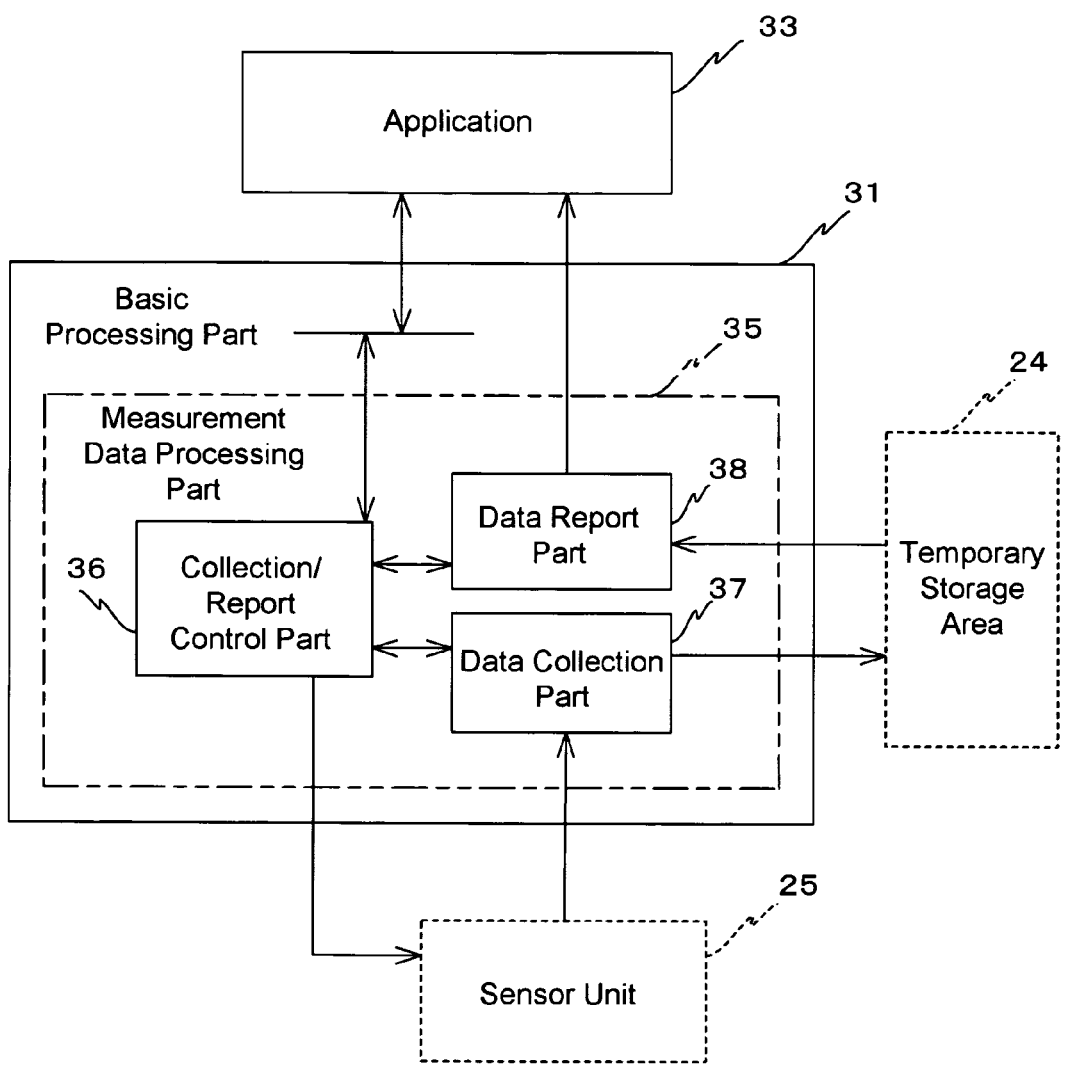
FIG. 3 is a block diagram for explaining the arrangement of software to be executed by the control unit of the cellular phone device according to the first embodiment of the present invention.

The control unit 21 comprises a central processing unit (CPU) and a digital signal processor (DSP). The control unit 21 executes various data processing operations and controls the operations of the remaining constituent elements described above to implement a general cellular phone function. FIG. 3 shows the arrangement of software such as a program to be executed by the control unit 21.

The software to be executed by the control unit 21 includes (i) a basic processing part 31 which implements a speech communication function, mail function, and character input function, i.e., the basic functions of the cellular phone and controls the above-described various kinds of hardware resources, and (ii) an application 33 to provide various contents such as a game to the user. The application 33 uses a measurement result obtained by the sensor unit 25.

The basic processing part 31 comprises a measurement data processing part 35. The measurement data processing part 35 comprises (i) a collection/report control part 36 which processes commands from the application 33 and controls the measurement operation of the sensor unit 25 and the entire measurement data processing part 35, and (ii) a data collection part 37 which stores, in the temporary storage area 24 of the storage unit 23 described above, measurement data that satisfies a data collection condition designated by the application 33. The measurement data processing part 35 also comprises (iii) a data report part 38 which reports, to the application 33, measurement data that satisfies a data report condition designated by the application 33, of the measurement data stored in the temporary storage area 24.

The data collection part 37 has offset correction information measured in advance, and physical quantity conversion information to convert offset-corrected data into data which directly reflects a physical quantity such as an angle or acceleration. The data collection part 37 executes offset correction and physical quantity conversion sequentially for raw measurement data from the sensor unit 25, thereby calculating measurement data.

When collection of measurement data which satisfies the data collection condition is completed, the data collection part 37 notifies the collection/report control part 36 of it. Upon receiving the notification, the collection/report control part 36 reports the completion of collection of measurement data satisfying the data collection condition to the application 33 if it has been designated by the application 33 that the completion of data collection should be reported.

In storing data in the temporary storage area 24, the data collection part 37 uses the temporary storage area 24 as a ring buffer. That is, the data collection part 37 sequentially updates the storage address of the temporary storage area 24 every time data is stored. When the data is stored up to the final address of the temporary storage area 24, data is newly stored from the start address of the temporary storage area 24.

The basic processing part 31 analyzes key input by the user. When the key input indicates the operation start instruction or operation stop instruction for the sensor unit 25, the collection/report control part 36 is notified of it.

Except the speech communication mode, the basic processing part 31 supports specific command input including the operation start instruction input and operation stop instruction input for the sensor unit 25 by user's voice input through the microphone 15. When the command input by voice indicates the operation start instruction or operation stop instruction for the sensor unit 25, the collection/report control part 36 is notified of it.

When the operation start or stop time of the sensor unit 25 is detected by time count of the timepiece device 29, the collection/report control part 36 is notified of it. Setting of time count by the timepiece device 29 is done by user's key input or a request from the application 33.

The basic processing part 31 executes so-called task management and activates or stops the application. In application activation processing, the basic processing part 31 determines on the basis of management information held by the application to be activated whether the application should use the sensor unit 25. If the determination result is affirmative, the collection/report control part 36 is notified that the sensor should be activated almost simultaneously with activation of the application. Even in application stop processing, the basic processing part 31 executes the same determination. If the determination result is affirmative, the collection/report control part 36 is notified that the sensor should be stopped almost simultaneously with stop of the application.

Even when the application management information does not indicate the use of the sensor unit 25, the application can use the sensor unit 25 by issuing, to the collection/report control part 36, an operation start request or stop request of the sensor unit 25.

When the operation start instruction event or operation stop instruction event of the sensor unit 25 has occurred, and the collection/report control part 36 is notified of it, the collection/report control part 36 sends a sensor operation start instruction or sensor operation stop instruction to the sensor unit 25. When the collection/report control part 36 is notified of the operation start instruction event during the operation of the sensor unit 25, no new sensor operation start instruction is sent to the sensor unit 25. When the collection/report control part 36 is notified of the operation stop instruction event in the stopped state of the sensor unit 25, no new sensor operation stop instruction is sent to the sensor unit 25.

<Measurement Data Collection and Report Operation>

A measurement data collection operation and a measurement data report operation to the application 33 in this embodiment will be described next. Assume that the application 33 is already activated.

(1-1) Immediate Acquisition of One Data (Acquisition Operation #1)

Figure 4:
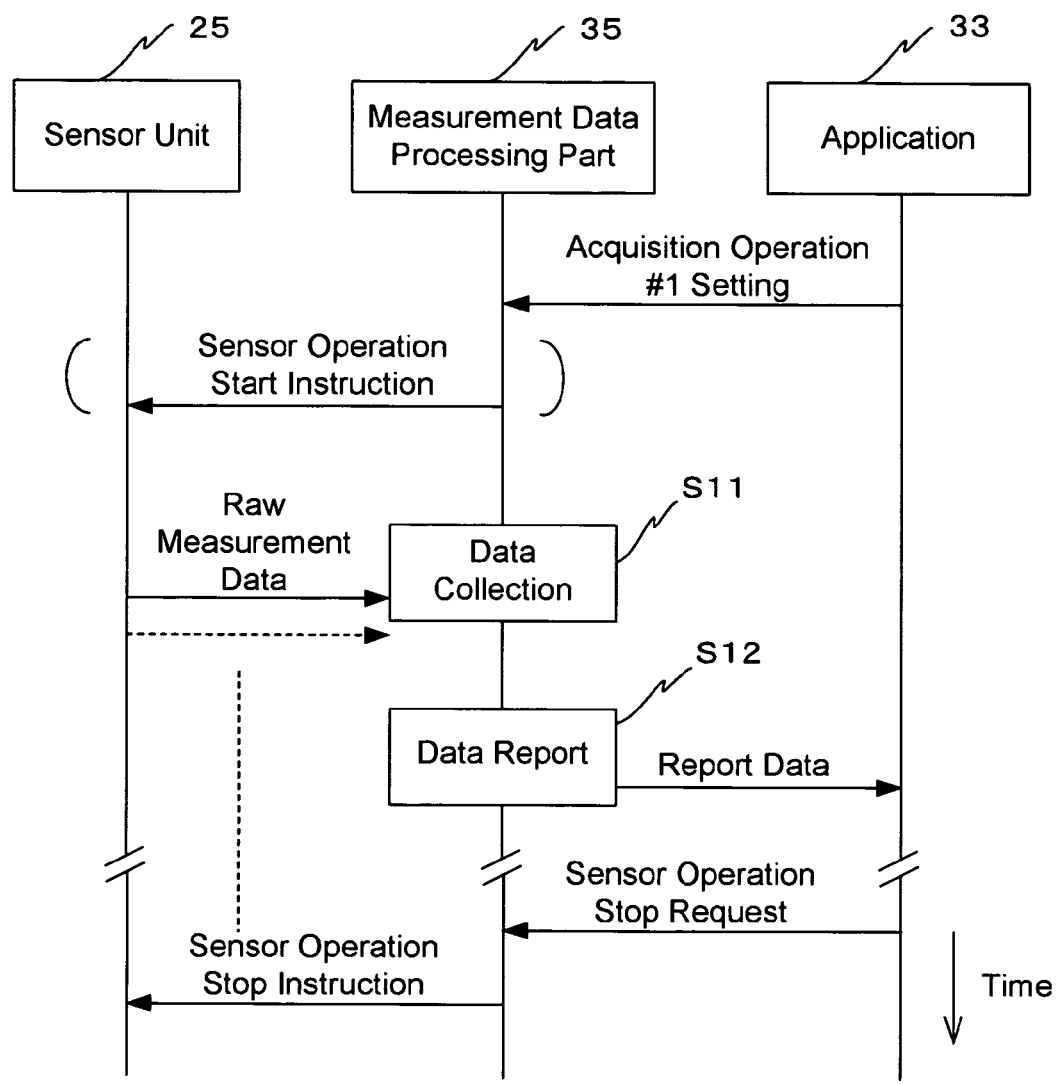
FIG. 4 is a sequence chart for explaining processing in acquisition operation #1.

In acquisition operation #1, as shown in FIG. 4, the application 33 sends, to the measurement data processing part 35, an acquisition operation #1 setting instruction containing an application identifier as a parameter. With the acquisition operation #1 setting instruction, the measurement data processing part 35 is notified that measurement data which satisfies the data collection condition is the first measurement data obtained after the acquisition operation #1 setting instruction. In addition, the measurement data processing part 35 is notified that measurement data which satisfies the data report condition is the first measurement data stored in the temporary storage area 24 after the acquisition operation #1 setting instruction.

In the measurement data processing part 35, the collection/report control part 36 receives the acquisition operation #1 setting instruction. The collection/report control part 36 determines whether the sensor unit 25 is operating. More specifically, when the above-described sensor operation start event has occurred before, and the sensor unit 25 has already started the operation in accordance with the sensor operation start instruction from the collection/report control part 36 and is continuously operating, the determination result is affirmative.

If the determination result is negative, the collection/report control part 36 sends the sensor operation start instruction to the sensor unit 25. That is, in this case, the collection/report control part 36 interprets that the acquisition operation #1 setting instruction also serves as a sensor operation start request. Upon receiving the sensor operation start instruction, the sensor unit 25 starts the sensor operation. A detection result by the sensor part 26 is converted into digital data by the A/D converter 27 and output to the control unit 21 (more specifically, the data collection part 37) periodically (e.g., at a period of 1 msec) as raw measurement data.

The collection/report control part 36 notifies the data collection part 37 of the data collection condition of acquisition operation #1 together with measurement data format information and the application identifier of the application 33. Upon receiving this notification, the data collection part 37 starts data collection processing in step S11.

In step S11, upon receiving the first raw measurement data from the sensor unit 25, the data collection part 37 sequentially executes offset correction and physical quantity conversion to calculate measurement data corresponding to the raw measurement data. The data collection part 37 stores the calculated measurement data in the temporary storage area 24 together with time stamp information. The data collection part 37 sends, to the collection/report control part 36, a notification representing that collection of measurement data satisfying the data collection condition corresponding to acquisition operation #1 is completed, together with the application identifier and the storage address of the measurement data in the temporary storage area 24. The processing in step S11 is ended.

Upon receiving the notification representing that the data collection operation corresponding to acquisition operation #1 is completed, the collection/report control part 36 notifies the data report part 38 of the data report condition of acquisition operation #1 together with the storage address of the measurement data and the application identifier of the application 33, which are received from the data collection part 37. Upon receiving this notification, the data report part 38 starts data report processing in step S12.

In step S12, the data report part 38 reads out the measurement data to be reported to the application 33 from the temporary storage area 24 by using the storage address received from the collection/report control part 36. Then, the data report part 38 reports the readout measurement data to the application 33 by using the application identifier received from the collection/report control part 36. The data report part 38 notifies the collection/report control part 36 that data report is completed. The processing in step S12 is ended.

When the processing of acquisition operation #1 is executed in the above-described way, the application 33 can immediately acquire the first measurement data obtained after the acquisition operation #1 setting instruction which is issued at a desired point of time and also serves as a data request.

After the collection/report control part 36 issues the sensor operation start instruction, the sensor unit 25 continuously executes the sensor operation and outputs raw measurement data periodically independently of whether data collection is executed by the data collection part 37. The sensor operation is stopped when the sensor operation stop instruction is issued from the collection/report control part 36 in response to occurrence of the above-described sensor operation stop event. Referring to FIG. 4, as a form example of sensor operation stop, the application 33 sends a sensor operation stop request to the measurement data processing part 35 at a desired point of time. If abnormal termination has occurred with neither issue of the sensor operation stop request by the application 33 nor occurrence of the above-described sensor operation stop event, the basic processing part 31 which monitors execution of the application 33 requests the collection/report control part 36 to stop the sensor operation. Then, the sensor operation stop instruction is issued from the collection/report control part 36. This sensor operation stop method is also used when the sensor operation starts in acquisition operations #2 to #9 to be described later.

(1-2) Immediate Batch Acquisition of Multiple Data (Acquisition Operation #2)

Figure 5:
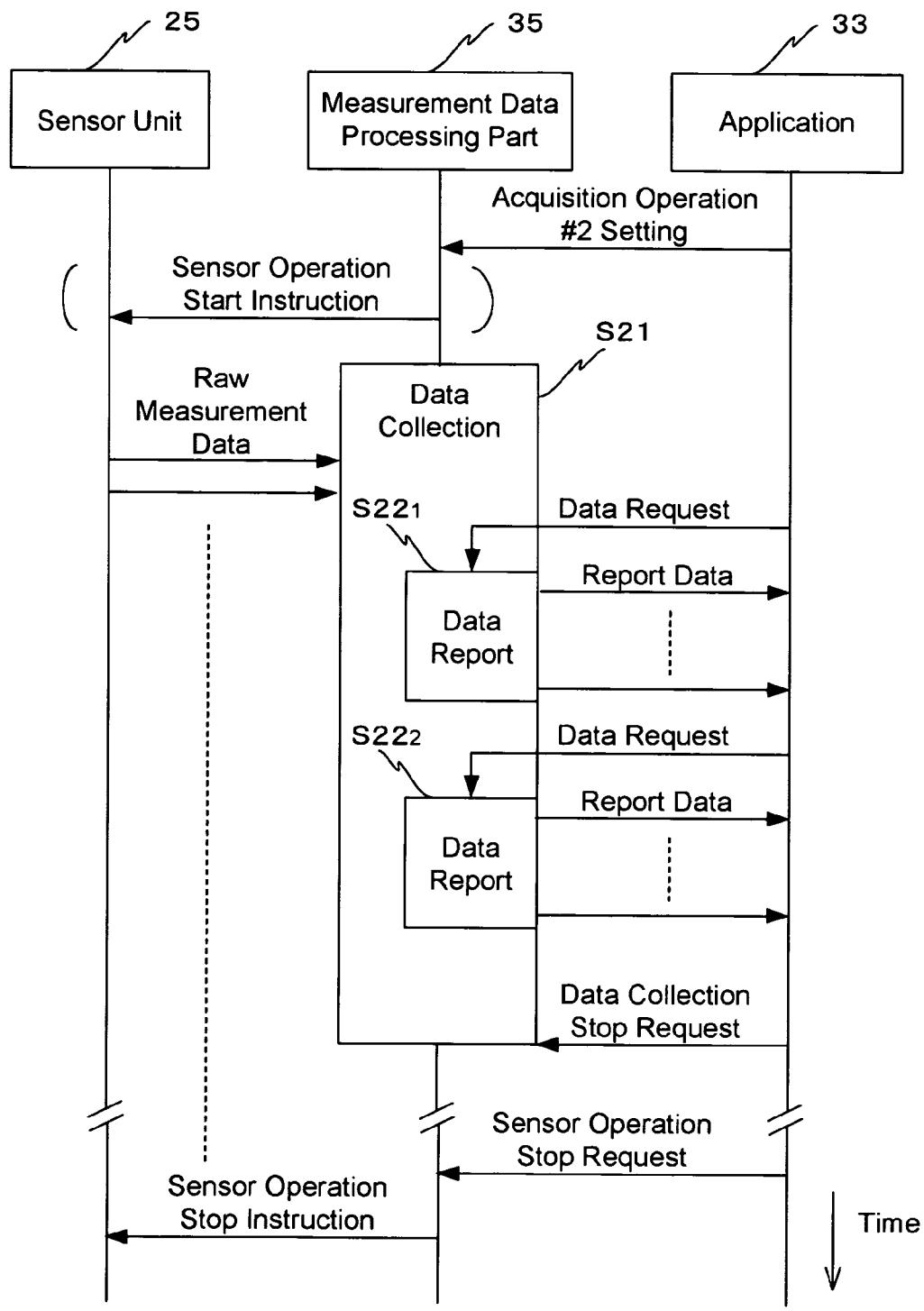
FIG. 5 is a sequence chart for explaining processing in acquisition operation #2.

In acquisition operation #2, as shown in FIG. 5, the application 33 sends, to the measurement data processing part 35, an acquisition operation #2 setting instruction containing an application identifier, data collection period TP2, and maximum number NM of notification data (or maximum notification time TM) as parameters. As the data collection period TP2, a natural number multiple of the periodical notification period of raw measurement data from the sensor unit 25 is designated.

With the acquisition operation #2 setting instruction, the measurement data processing part 35 is notified that measurement data which satisfies the data collection condition includes the first measurement data received from the sensor unit 25 after the acquisition operation #2 setting instruction and subsequent measurement data obtained at the data collection period TP2. In addition, the measurement data processing part 35 is notified that measurement data which satisfies the data report condition includes measurement data which are collected by the data collection part 37 before data request to be issued by the application 33 later and whose number is equal to or smaller than the maximum number NM of notification data of measurement data collected at the latest timing when viewed from the data request issue timing (or measurement data collected within the maximum notification time TM in a reverse chronological order from the data request issue timing).

In the measurement data processing part 35, the collection/report control part 36 receives the acquisition operation #2 setting instruction. The collection/report control part 36 determines whether the sensor unit 25 is operating, as in (1-1) described above, and executes processing corresponding to the determination result.

The collection/report control part 36 notifies the data collection part 37 of the data collection condition corresponding to acquisition operation #2 together with the application identifier of the application 33. Upon receiving this notification, the data collection part 37 starts data collection processing in step S21.

Figure 6:
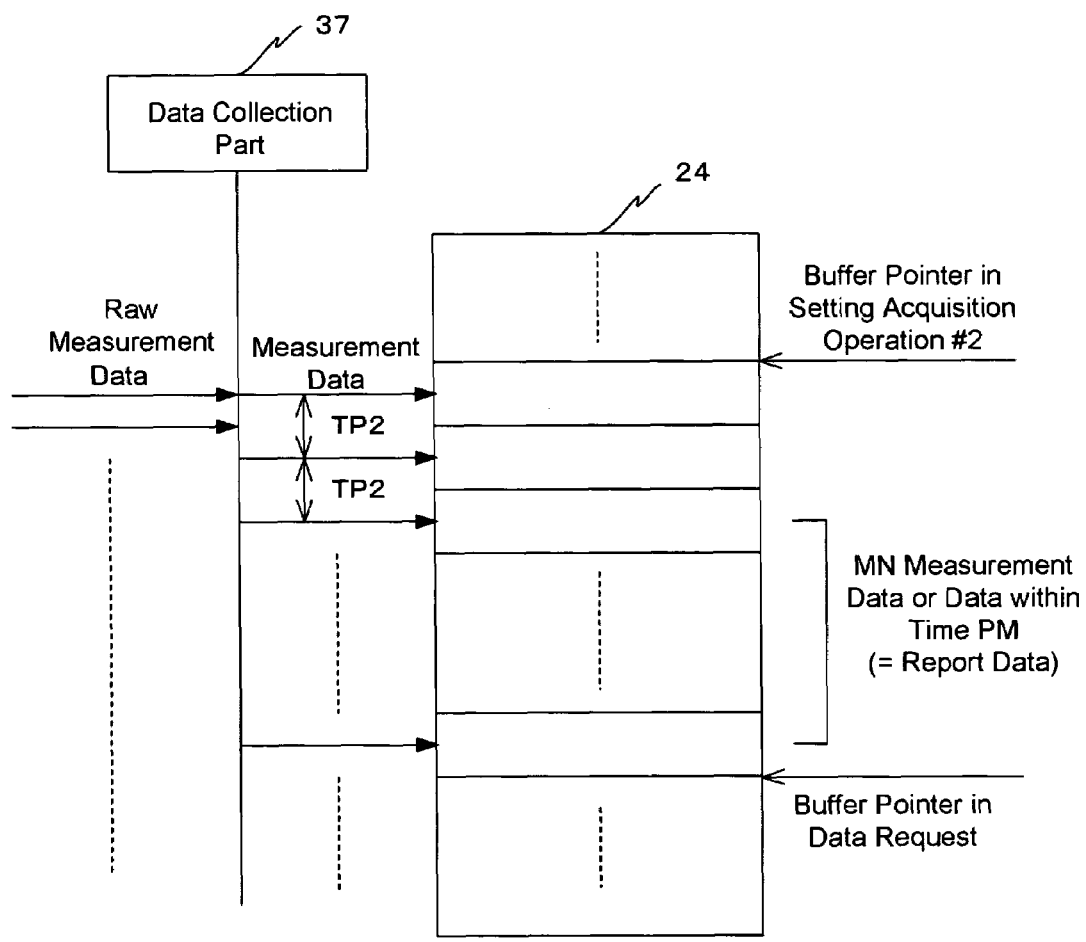
FIG. 6 is a view for explaining data collection in acquisition operation #2.

In step S21, upon receiving raw measurement data from the sensor unit 25 for the first time, the data collection part 37 calculates measurement data corresponding to the first raw measurement data, as in (1-1). The data collection part 37 stores the calculated measurement data in the temporary storage area 24 together with time stamp information. Every time raw measurement data is received from the sensor unit 25 at the period TP2, measurement data corresponding to the raw measurement data is calculated and sequentially stored in the temporary storage area 24 together with time stamp information. Every time new measurement data is stored in the temporary storage area 24, the data collection part 37 notifies the collection/report control part 36 of the storage address of the data. FIG. 6 shows the data collection operation and the storage operation in the temporary storage area 24 by the data collection part 37 in step S21. FIG. 6 shows a case wherein the data collection part 37 is notified of only the data collection condition according to the above-described acquisition operation #2 setting instruction by the application 33.

Referring back to FIG. 5, at a desired point of time during data collection by the data collection part 37, the application 33 sends a data request containing the application identifier as a parameter to the measurement data processing part 35. In the measurement data processing part 35, the collection/report control part 36 receives the data request. The collection/report control part 36 notifies the data report part 38 of the data report condition designated by the above-described acquisition operation #2 setting instruction together with the application identifier of the application 33 and the latest measurement data storage address in the temporary storage area 24. Upon receiving this notification, the data report part 38 starts data report processing in step $S22_1$.

In step $S22_1$, the data report part 38 extracts measurement data satisfying the data report condition from the temporary storage area 24 on the basis of the current time, the data collection period TP2, the maximum number NM of notification data (or maximum notification time TM), the latest measurement data storage address in the temporary storage area 24, and time stamp information for each measurement data stored in the temporary storage area 24 (FIG. 6). Subsequently, the data report part 38 time-serially reports the extracted measurement data to the application 33 as report data. The data report part 38 notifies the collection/report control part 36 that data report is completed. The processing in step S22₁ is ended.

When the processing of acquisition operation #2 is executed in the above-described way, the application 33 can immediately acquire, at once, measurement data which satisfy a notification condition designated by the acquisition operation #2 setting instruction issued before by issuing a data request at a desired point of time.

In acquisition operation #2, data collection processing in step S21 is executed in parallel to the data report processing in step S22₁ and also continuously executed even after the data report processing in step S22₁ is ended. For this reason, after acquisition operation #2 is set, the application 33 can immediately acquire, at once, measurement data which satisfy a notification condition designated by the acquisition operation #2 setting instruction issued before by issuing a data request any number of times (twice in the example shown in FIG. 5) at desired points of time.

The data collection processing in step S21 is ended when the application 33 issues a data collection stop request at a desired timing. If abnormal termination has occurred without any issue of the data collection stop request by the application 33, the basic processing part 31 which monitors execution of the application 33 issues a data collection stop request to the collection/report control part 36 to end the data collection processing in step S21. This collection operation stop method also applies to acquisition operations #3 to #6 to be described later.

(1-3) First Conditional Acquisition (Acquisition Operation #3)

Figure 7:
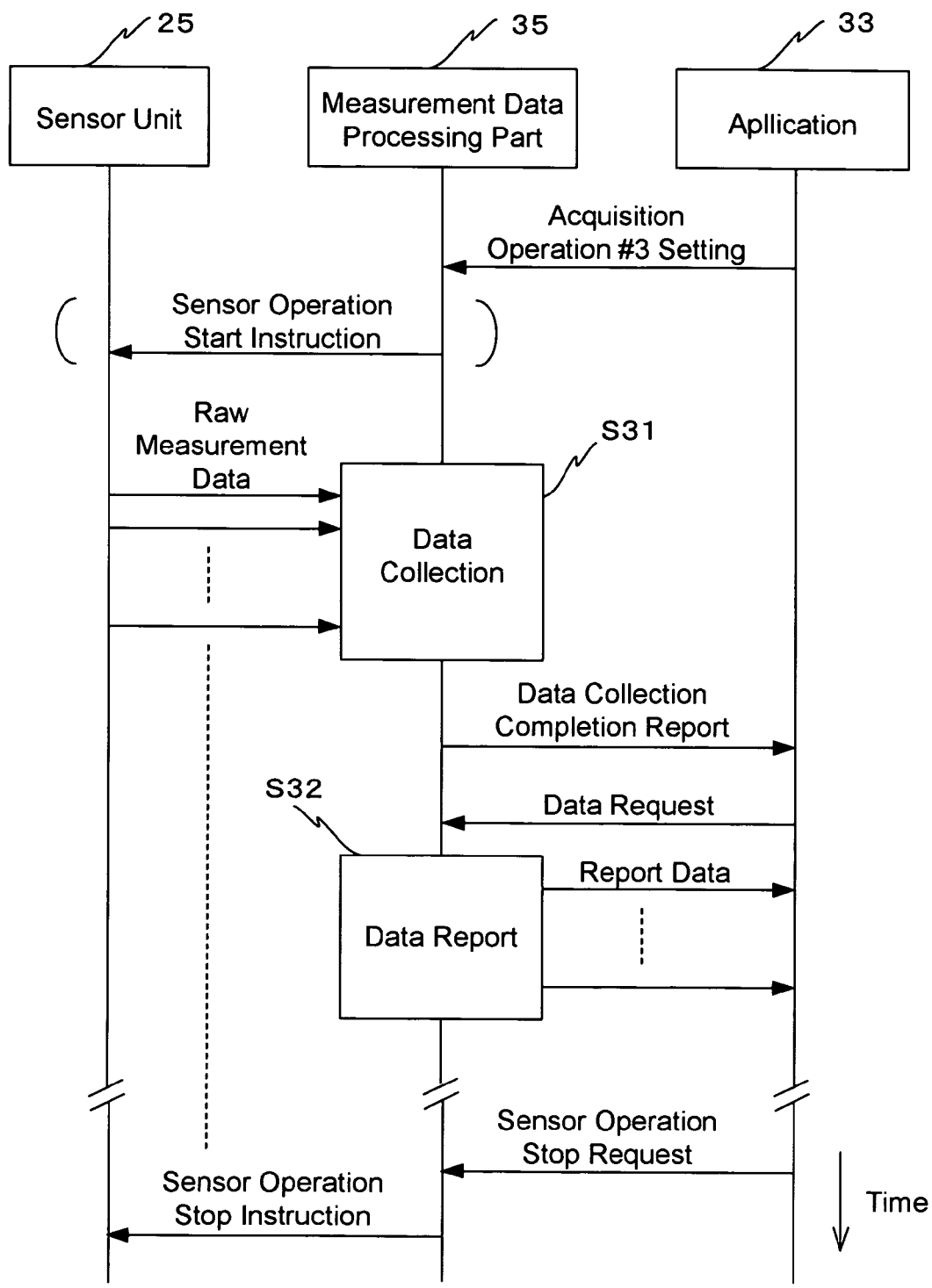
FIG. 7 is a sequence chart for explaining processing in acquisition operation #3.

In acquisition operation #3, as shown in FIG. 7, the application 33 sends, to the measurement data processing part 35, an acquisition operation #3 setting instruction containing an application identifier, data collection period TP3, and maximum number NA of collection data (or maximum collection time TA) as a collection limit condition as parameters. As the data collection period TP3, a natural number multiple of the periodical notification period of raw measurement data from the sensor unit 25 is designated, as in (1-2) described above.

With the acquisition operation #3 setting instruction, the measurement data processing part 35 is notified that measurement data which satisfies the data collection condition includes the first measurement data received from the sensor unit 25 after the acquisition operation #3 setting instruction and subsequent measurement data obtained at the data collection period TP3, whose number is equal to or smaller than the maximum number NA of collection data (or which are collected within the maximum collection time TA after the acquisition operation #3 setting instruction). In addition, the measurement data processing part 35 is notified that measurement data which satisfies the data report condition includes measurement data which are collected by the data collection part 37 in accordance with the acquisition operation #3 setting instruction.

In the measurement data processing part 35, the collection/report control part 36 receives the acquisition operation #3 setting instruction. The collection/report control part 36 determines whether the sensor unit 25 is operating, as in (1-1) described above, and executes processing corresponding to the determination result.

The collection/report control part 36 notifies the data collection part 37 of the data collection condition together with the application identifier. Upon receiving this notification, the data collection part 37 starts data collection processing in step S31.

In step S31, upon receiving the first raw measurement data from the sensor unit 25, the data collection part 37 calculates measurement data corresponding to the first raw measurement data, as in (1-1) described above. The data collection part 37 stores the calculated measurement data in the temporary storage area 24 together with time stamp information.

Every time raw measurement data is received from the sensor unit 25 at the period TP3, measurement data corresponding to the raw measurement data is calculated and sequentially stored in the temporary storage area 24 together with time stamp information. Every time new measurement data is stored in the temporary storage area 24, the data collection part 37 notifies the collection/report control part 36 of the storage address of the data.

Figure 8:
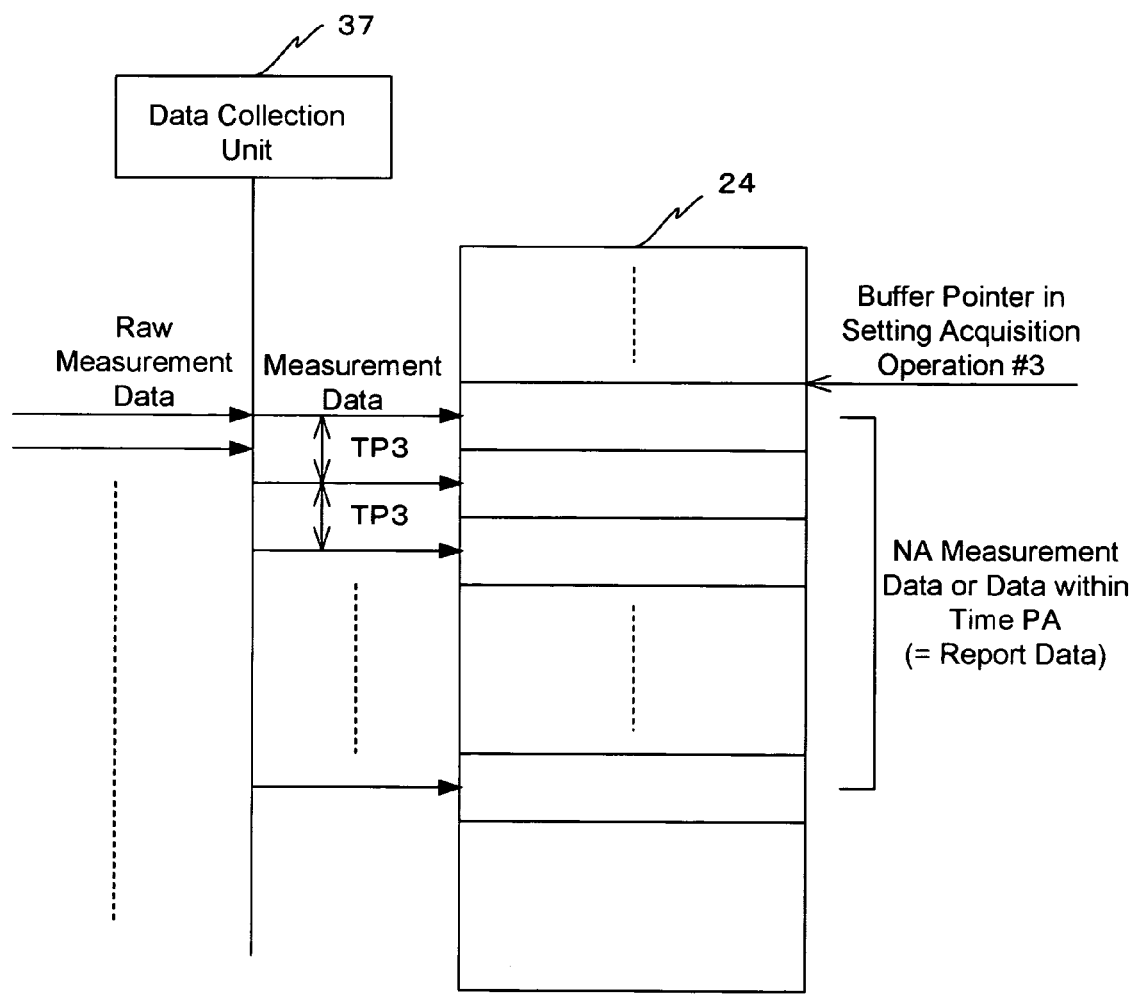
FIG. 8 is a view for explaining data collection in acquisition operation #3.

FIG. 8 shows the data collection operation and the storage operation in the temporary storage area 24 by the data collection part 37 in step S31. FIG. 8 shows a case wherein the data collection part 37 is notified of only the data collection condition according to the above-described acquisition operation #3 setting instruction by the application 33.

Assume that the maximum number NA of collection data is designated. In this case, the data collection part 37 ends data collection when the number of collected measurement data reaches the maximum number NA of collection data. Assume that the maximum collection time TA is designated. In this case, the data collection part 37 ends data collection when the maximum collection time TA elapses from the notification of the application identifier and a data collection condition corresponding to acquisition operation #3. When data collection is ended, the data collection part 37 sends, to the collection/report control part 36, a notification representing that collection of measurement data satisfying the data collection condition corresponding to acquisition operation #3 is completed, together with the application identifier. The processing in step S31 is ended.

Upon receiving the notification representing the completion of data collection corresponding to acquisition operation #3, the collection/report control part 36 notifies the application 33 of it. Upon receiving this notification, the application 33 sends a data request containing the application identifier as a parameter to the measurement data processing part 35. In the measurement data processing part 35, the collection/report control part 36 receives the data request. The collection/report control part 36 notifies the data report part 38 of the data report condition together with the application identifier of the application 33 and the first and last storage addresses, in the temporary storage area 24, of measurement data collected by the data collection part 37 in accordance with acquisition operation #3. Upon receiving this notification, the data report part 38 starts data report processing in step S32.

In step S32, the data report part 38 extracts measurement data satisfying the data report condition from the temporary storage area 24 on the basis of the first and last measurement data storage addresses in the temporary storage area 24 in accordance with acquisition operation #3, the data collection period TP3, and time stamp information for each measurement data stored in the temporary storage area 24 (FIG. 8). The data report part 38 reports the extracted measurement data to the application 33 as report data. The data report part 38 notifies the collection/report control part 36 that data report is completed. The processing in step S32 is ended.

When the processing of acquisition operation #3 is executed in the above-described way, the application 33 can acquire measurement data which are collected after the acquisition operation #3 setting instruction at the desired data collection period TP3 in number equal to or smaller than the number NA (or measurement data collected within the desired collection time TA). When data collection corresponding to the acquisition operation #3 setting instruction is completed, the data collection completion is reported to the application 33. When a data request is issued after the data collection completion report, measurement data collected in accordance with the acquisition operation #3 setting instruction can be acquired.

(1-4) Second Conditional Acquisition (Acquisition Operation #4)

Figure 9:
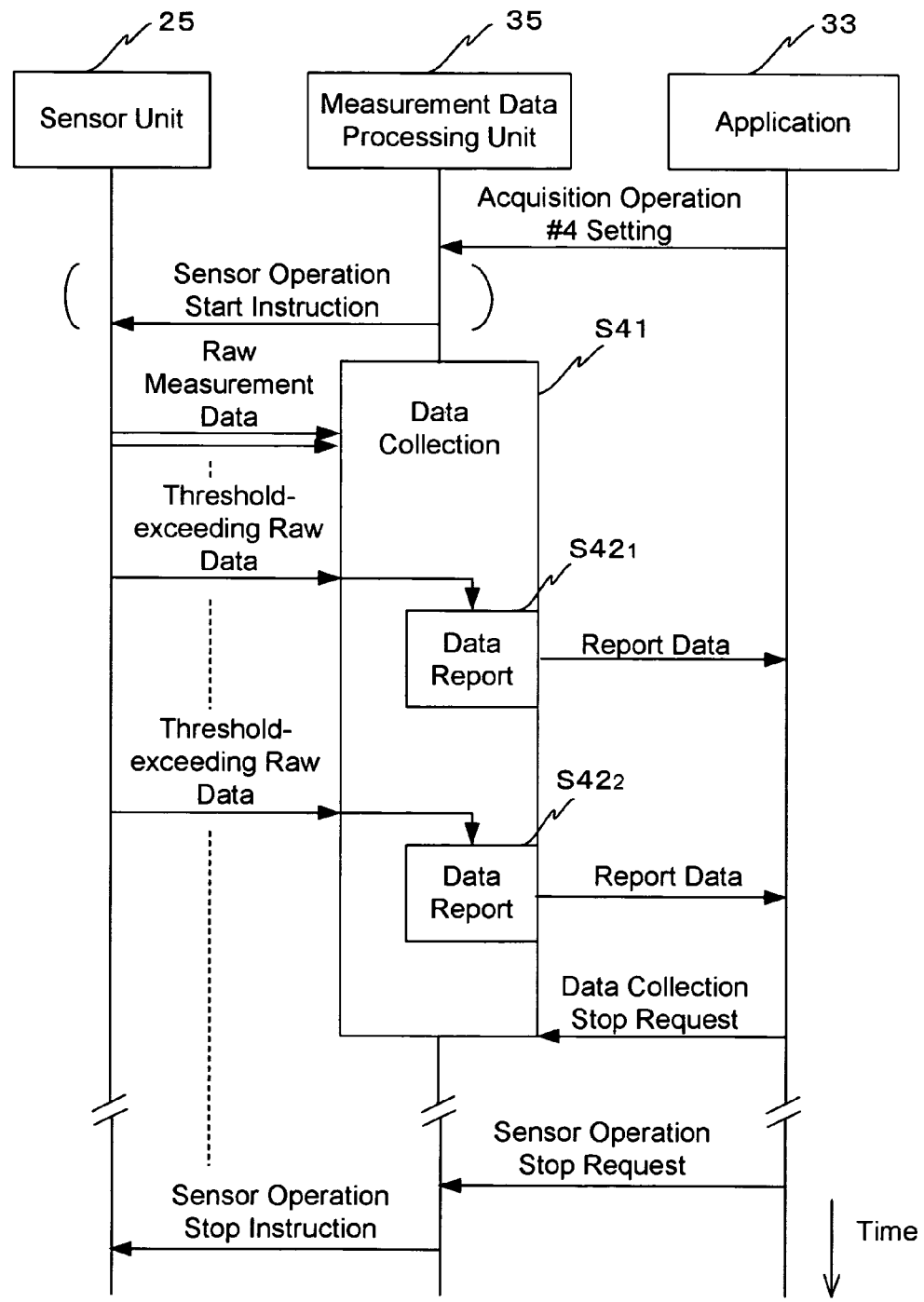
FIG. 9 is a sequence chart for explaining processing in acquisition operation #4.

In acquisition operation #4, as shown in FIG. 9, the application 33 sends, to the measurement data processing part 35, an acquisition operation #4 setting instruction containing an application identifier, threshold information, and maximum number NB of collection data (or maximum collection time TB) as a collection limit condition as parameters.

Threshold information can be designated for each of the pitch angle $\theta_X$, roll angle $\theta_Y$, yaw angle $\theta_Z$, X-direction acceleration $\alpha_X$, and Y-direction acceleration $\alpha_Y$ contained on one measurement data. The threshold information contains a threshold value and a designation for whether the data range of measurement data to be acquired is a range to which a value larger than the threshold value belongs or a range to which a value smaller than the threshold value belongs. The threshold value also contains a designation for whether the threshold value is set for a change value from the value of the first measurement data. Even in acquisition operations #5 and #6 to be described later, these pieces of information are contained in the threshold information.

With the acquisition operation #4 setting instruction, the measurement data processing part 35 is notified that measurement data which satisfies the data collection condition includes measurement data (to be referred to as "threshold-exceeding data" hereinafter) satisfying the threshold information, which are received from the sensor unit 25 after the acquisition operation #4 setting instruction and whose number is equal to or smaller than the maximum number NB of collection data (or which are collected within the maximum collection time TB after the acquisition operation #4 setting instruction). In addition, the measurement data processing part 35 is notified that measurement data which satisfies the data report condition includes measurement data which are collected by the data collection part 37 in accordance with the acquisition operation #4 setting instruction.

In the measurement data processing part 35, the collection/report control part 36 receives the acquisition operation #4 setting instruction. The collection/report control part 36 determines whether the sensor unit 25 is operating, as in (1-1) described above, and executes processing corresponding to the determination result.

The collection/report control part 36 notifies the data collection part 37 of the data collection condition of acquisition operation #4 together with the application identifier of the application 33. Upon receiving this notification, the data collection part 37 starts data collection processing in step S41.

In step S41, upon receiving raw measurement data from the sensor unit 25, the data collection part 37 calculates measurement data corresponding to the raw measurement data, as in (1-1) described above. The data collection part 37 determines whether the calculated measurement data is threshold-exceeding data. If the determination result is negative, the data collection part 37 waits for the next raw measurement data.

If the determination result is affirmative, the data collection part 37 stores the threshold-exceeding data in the temporary storage area 24 together with time stamp information. The data collection part 37 sends, to the collection/report control part 36, a notification representing the collection of threshold-exceeding data together with the application identifier and the measurement data storage address in the temporary storage area 24. After that, the data collection part 37 waits for the next raw measurement data.

Until NB threshold-exceeding data are collected (or until the time TB elapses after the notification of the data collection condition of acquisition operation #4), the data collection part 37 executes the data collection processing in step S41.

Every time the notification representing collection of threshold-exceeding data is received, the collection/report control part 36 notifies the data report part 38 of the data report condition of acquisition operation #4 together with the threshold-exceeding data storage address and the application identifier of the application 33, which are received from the data collection part 37. Upon receiving this notification, the data report part 38 starts data report processing in step S42$_j$ (j=1, 2, . . . )

In step S42$_j$, the data report part 38 reads out the threshold-exceeding data to be reported to the application 33 from the temporary storage area 24 by using the threshold-exceeding data storage address received from the collection/report control part 36. The data report part 38 reports the readout threshold-exceeding data to the application 33 by using the application identifier received from the collection/report control part 36. The data report part 38 notifies the collection/report control part 36 that data report is completed. The processing in step S42$_j$ is ended.

When the processing of acquisition operation #4 is executed in the above-described way, the application 33 can immediately acquire measurement data which satisfies desired threshold information, i.e., threshold-exceeding data within a range satisfying the collection limit condition every time threshold-exceeding data is received from the sensor unit 25.

(1-5) Third Conditional Acquisition (Acquisition Operation #5)

Figure 10:
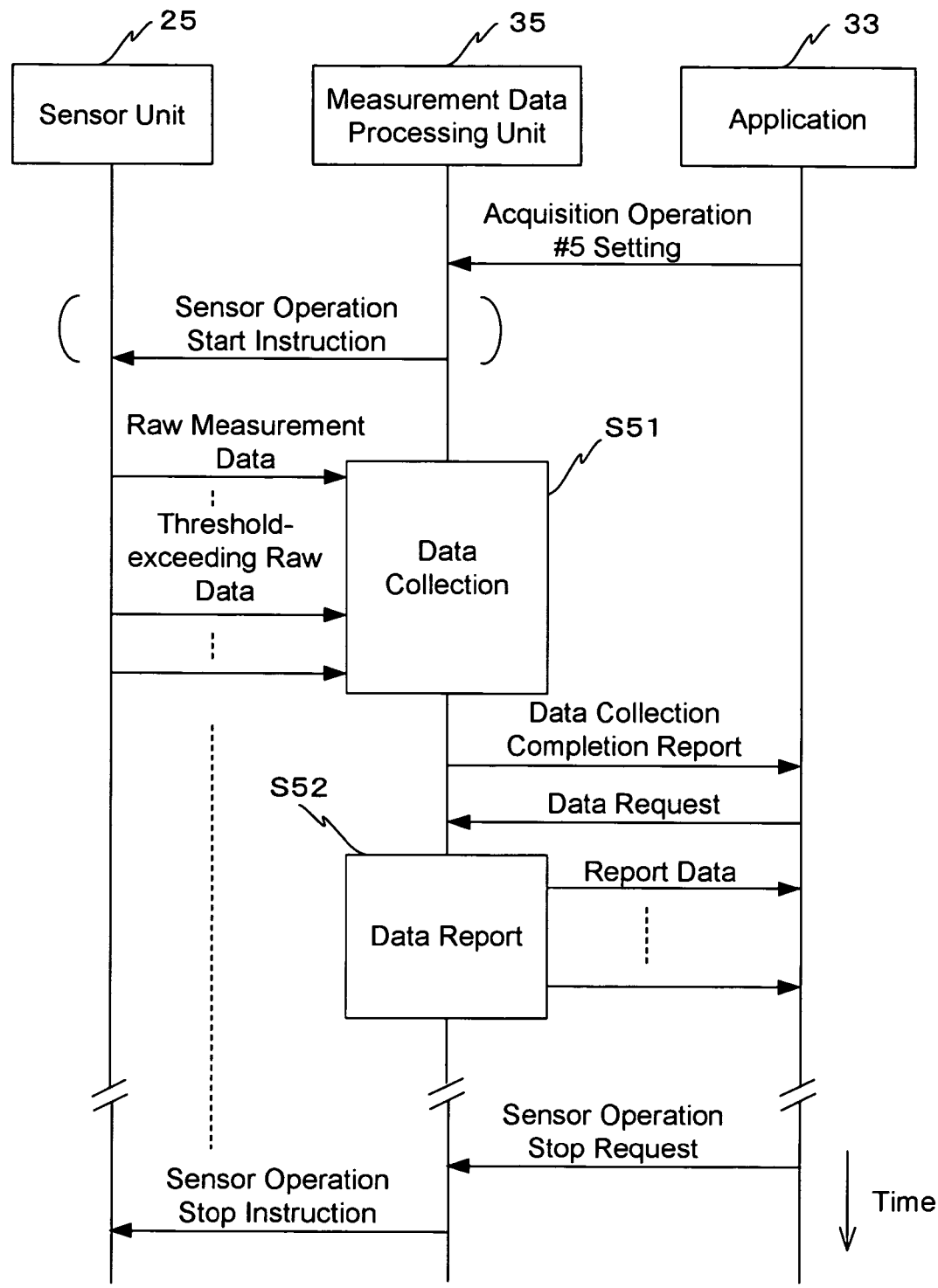
FIG. 10 is a sequence chart for explaining processing in acquisition operation #5.

In acquisition operation #5, as shown in FIG. 10, the application 33 sends, to the measurement data processing part 35, an acquisition operation #5 setting instruction containing an application identifier, threshold information, data collection period TP5, and maximum number NC of collection data (or maximum collection time TC) as a collection limit condition as parameters. As the data collection period TP5, a natural number multiple of the periodical notification period of raw measurement data from the sensor unit 25 is designated, as in (1-2) described above.

With the acquisition operation #5 setting instruction, the measurement data processing part 35 is notified that measurement data which satisfies the data collection condition includes the first threshold-exceeding data received from the sensor unit 25 after the acquisition operation #4 setting instruction and subsequent measurement data which are sequentially received from the sensor unit 25 at the period TP5 and whose number is equal to or smaller than the maximum number NC of collection data (or which are collected until the maximum collection time TC elapses after the acquisition operation #5 setting instruction). In addition, the measurement data processing part 35 is notified that measurement data which satisfies the data report condition includes measurement data which are collected by the data collection part 37 in accordance with the acquisition operation #5 setting instruction.

In the measurement data processing part 35, the collection/report control part 36 receives the acquisition operation #5 setting instruction. The collection/report control part 36 determines whether the sensor unit 25 is operating, as in (1-1) described above, and executes processing corresponding to the determination result.

The collection/report control part 36 notifies the data collection part 37 of the data collection condition together with the application identifier and measurement data format information. Upon receiving this notification, the data collection part 37 starts data collection processing in step S51.

In step S51, every time raw measurement data from the sensor unit 25 is received, the data collection part 37 calculates measurement data corresponding to the raw measurement data, as in (1-1) described above. The data collection part 37 determines whether the calculated measurement data is threshold-exceeding data. If the determination result is negative, the data collection part 37 waits for the next raw measurement data.

When raw measurement data reception and threshold-exceeding data determination are repeated, and the determination result becomes affirmative for the first time, the data collection part 37 stores the threshold-exceeding data in the temporary storage area 24 together with time stamp information.

Figure 11:
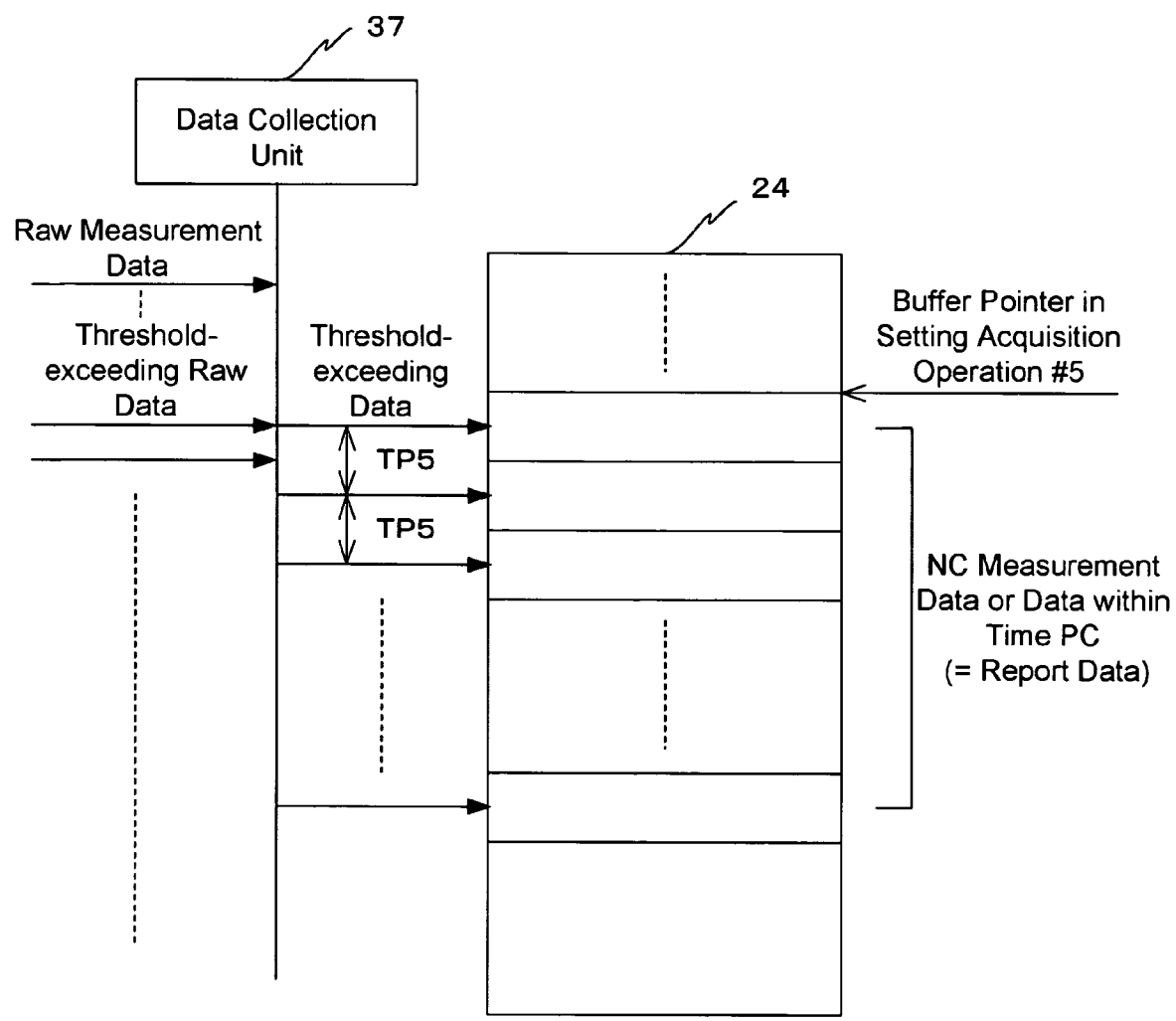
FIG. 11 is a view for explaining data collection in acquisition operation #5.

Every time raw measurement data from the sensor unit 25 is received at the period TP5, the data collection part 37 calculates measurement data corresponding to the raw measurement data and sequentially stores it in the temporary storage area 24 together with time stamp information. Every time new measurement data is stored in the temporary storage area 24, the data collection part 37 notifies the collection/report control part 36 of the storage address of the measurement data. FIG. 11 shows the data collection operation and the storage operation in the temporary storage area 24 by the data collection part 37 in step S51. FIG. 11 shows a case wherein the data collection part 37 is notified of only the data collection condition according to the above-described acquisition operation #5 setting instruction by the application 33, as in FIG. 6.

Assume that the maximum number NC of collection data is designated. In this case, the data collection part 37 ends data collection when the number of collected measurement data reaches the maximum number NC of collection data. Assume that the maximum collection time TC is designated. In this case, the data collection part 37 ends data collection when the maximum collection time TC elapses from the notification of the application identifier and a data collection condition corresponding to acquisition operation #5. When data collection is ended, the data collection part 37 sends, to the collection/report control part 36, a notification representing that collection of measurement data satisfying the data collection condition corresponding to acquisition operation #5 is completed, together with the application identifier. The processing in step S51 is ended.

Upon receiving the notification representing that data collection corresponding to acquisition operation #5 is completed, the collection/report control part 36 notifies the application 33 of it. Upon receiving this notification, the application 33 sends a data request containing the application identifier as a parameter to the measurement data processing part 35 at a desired point of time. In the measurement data processing part 35, the collection/report control part 36 receives the data request. The collection/report control part 36 notifies the data report part 38 of the data report condition together with the application identifier of the application 33 and the first and last storage addresses, in the temporary storage area 24, of measurement data collected by the data collection part 37 in accordance with acquisition operation #5. Upon receiving this notification, the data report part 38 starts data report processing in step S52.

In step S52, the data report part 38 extracts measurement data satisfying the data report condition from the temporary storage area 24 on the basis of the first and last measurement data storage addresses in the temporary storage area 24 in accordance with acquisition operation #5, the data collection period TP5, and time stamp information for each measurement data stored in the temporary storage area 24 (FIG. 11). The data report part 38 reports the extracted measurement data to the application 33 as report data. The data report part 38 notifies the collection/report control part 36 that data report is completed. The processing in step S52 is ended.

When the processing of acquisition operation #5 is executed in the above-described way, the application 33 can acquire measurement data which are collected at the data collection period TP5, including the first threshold-exceeding data after the acquisition operation #5 setting instruction, in number equal to or smaller than the desired number NC (or measurement data collected within the desired collection time TC). When data collection corresponding to the acquisition operation #5 setting instruction is completed, the data collection completion is reported to the application 33. When a data request is issued after the data collection completion report is reported, measurement data collected in accordance with the acquisition operation #5 setting instruction can be acquired.

(1-6) Fourth Conditional Acquisition (Acquisition Operation #6)

Figure 12:
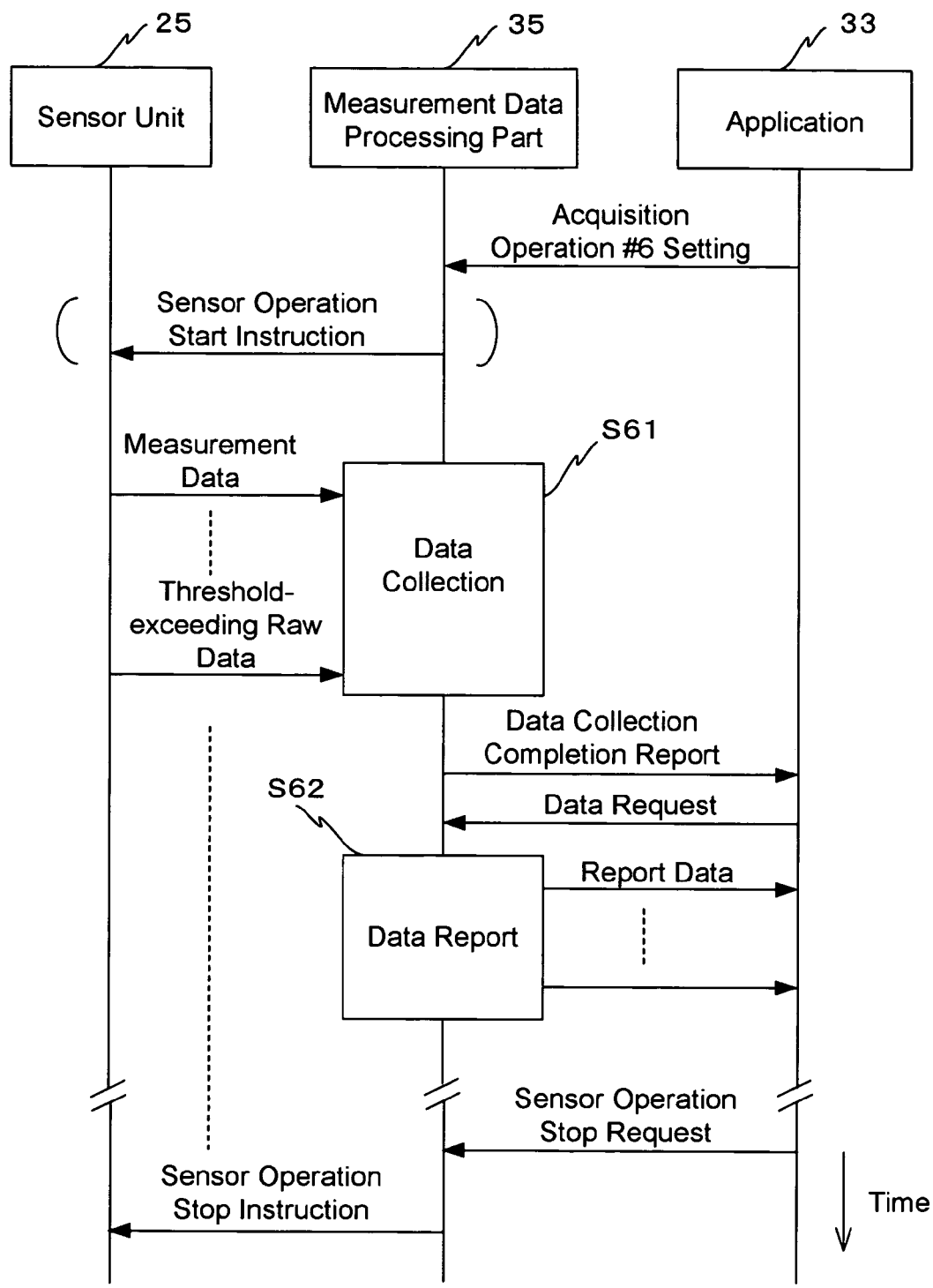
FIG. 12 is a sequence chart for explaining processing in acquisition operation #6.

In acquisition operation #6, as shown in FIG. 12, the application 33 sends, to the measurement data processing part 35, an acquisition operation #6 setting instruction containing an application identifier, threshold information, data collection period TP6, and maximum number ND of collection data (or maximum collection time TD) as a collection limit condition as parameters. As the data collection period TP6, a natural number multiple of the periodical notification period of raw measurement data from the sensor unit 25 is designated, as in (1-2) described above.

With the acquisition operation #6 setting instruction, the measurement data processing part 35 is notified that measurement data which satisfies the data collection condition includes measurement data obtained at the period TP6 after the acquisition operation #6 setting instruction until first threshold-exceeding data is received from the sensor unit 25. In addition, the measurement data processing part 35 is notified that measurement data which satisfies the data report condition includes measurement data which are collected by the data collection part 37 in accordance with the acquisition operation #6 setting instruction and whose number is equal to or smaller than the maximum number ND of collection data near the point of time of collection of the threshold-exceeding data (or measurement data collected within the maximum collection time TD before the point of time of collection of the threshold-exceeding data).

In the measurement data processing part 35, the collection/report control part 36 receives the acquisition operation #6 setting instruction. The collection/report control part 36 determines whether the sensor unit 25 is operating, as in (1-1) described above, and executes processing corresponding to the determination result.

The collection/report control part 36 notifies the data collection part 37 of the data collection condition together with the application identifier. Upon receiving this notification, the data collection part 37 starts data collection processing in step S61.

In step S61, upon receiving the first raw measurement data from the sensor unit 25, the data collection part 37 calculates measurement data corresponding to the first raw measurement data, as in (1-1) described above. The data collection part 37 stores the calculated measurement data in the temporary storage area 24 together with time stamp information.

Figure 13:
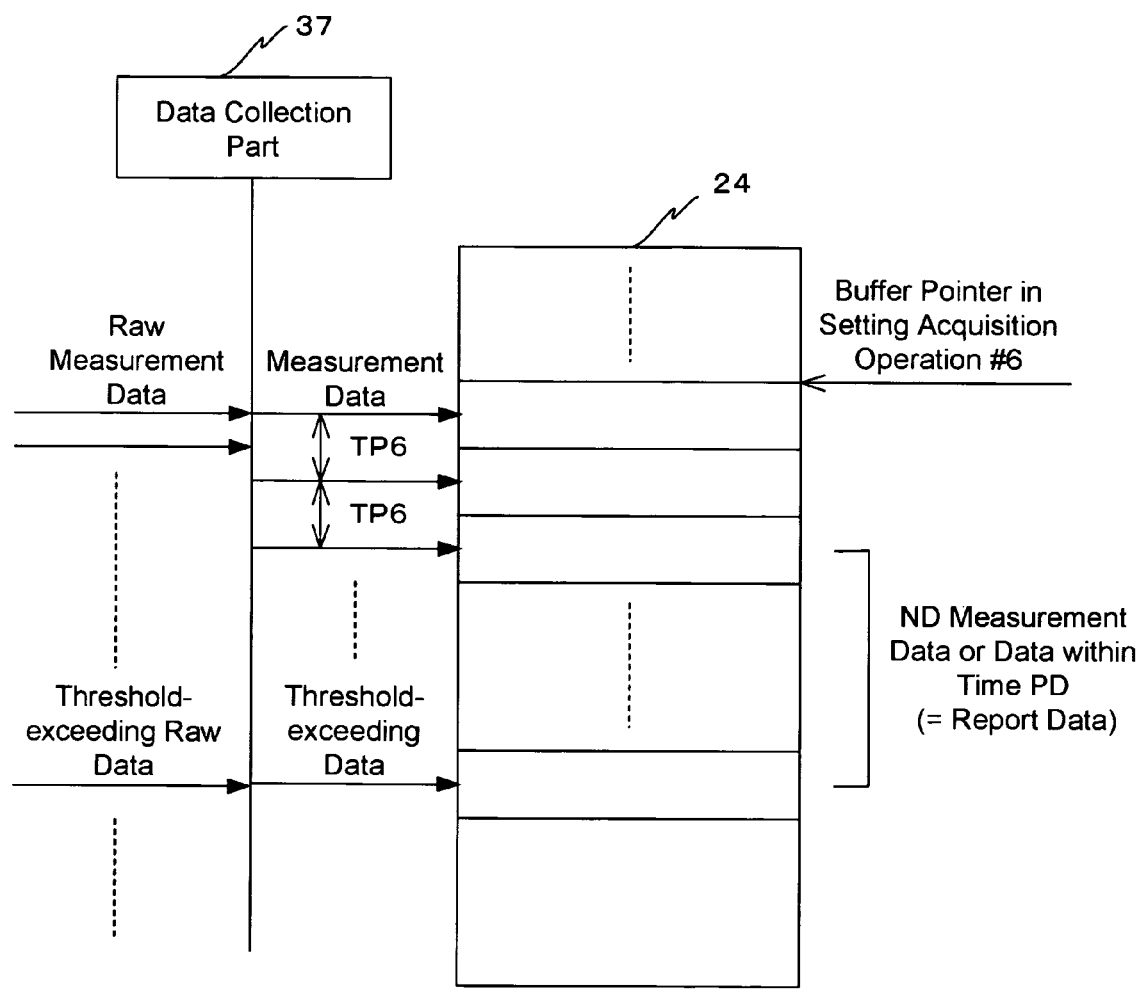
FIG. 13 is a view for explaining data collection in acquisition operation #6.
Figure 14:
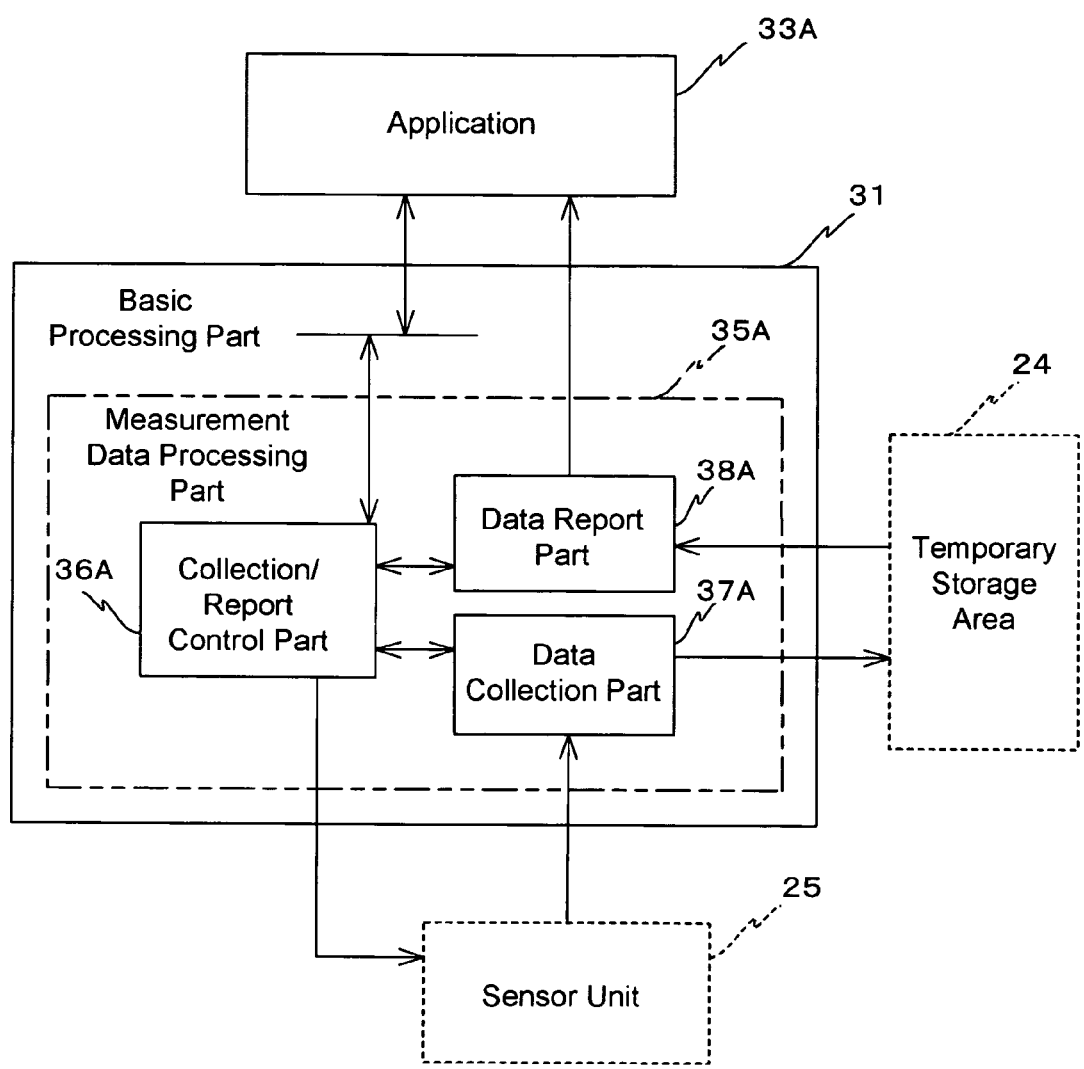
FIG. 14 is a block diagram for explaining the arrangement of software to be executed by the control unit of a cellular phone device according to the second embodiment of the present invention.

Every time raw measurement data from the sensor unit 25 is received at the period TP6, the data collection part 37 calculates measurement data corresponding to the raw measurement data and sequentially stores it in the temporary storage area 24 together with time stamp information. Every time new measurement data is stored in the temporary storage area 24, the data collection part 37 notifies the collection/report control part 36 of the storage address of the measurement data. FIG. 13 shows the data collection operation and the storage operation in the temporary storage area 24 by the data collection part 37 in step S61. FIG. 13 shows a case wherein the data collection part 37 is notified of only the data collection condition according to the above-described acquisition operation #6 setting instruction by the application 33.

Upon detecting the first threshold-exceeding data, the data collection part 37 stores the threshold-exceeding data in the temporary storage area 24 together with time stamp information and ends data collection according to the acquisition operation #6 setting instruction. The data collection part 37 sends, to the collection/report control part 36, a notification representing that collection of measurement data satisfying the data collection condition corresponding to acquisition operation #6 is completed, together with the application identifier. The processing in step S61 is ended.

Upon receiving the notification representing that data collection corresponding to acquisition operation #6 is completed, the collection/report control part 36 notifies the application 33 of it. Upon receiving this notification, the application 33 sends a data request containing the application identifier as a parameter to the measurement data processing part 35 at a desired point of time. In the measurement data processing part 35, the collection/report control part 36 receives the data request. The collection/report control part 36 notifies the data report part 38 of the data report condition together with the application identifier of the application 33 and the last storage address, in the temporary storage area 24, of measurement data collected by the data collection part 37 in accordance with acquisition operation #6. Upon receiving this notification, the data report part 38 starts data report processing in step S62.

In step S62, the data report part 38 extracts measurement data satisfying the data report condition from the temporary storage area 24 on the basis of the last measurement data storage address in the temporary storage area 24 in accordance with acquisition operation #6, the data collection period TP6, and time stamp information for each measurement data stored in the temporary storage area 24 (FIG. 13). The data report part 38 reports the extracted measurement data to the application 33 as report data. The data report part 38 notifies the collection/report control part 36 that data report is completed. The processing in step S62 is ended.

When the processing of acquisition operation #6 is executed in the above-described way, the application 33 can acquire measurement data which satisfy the notification condition designated by the acquisition operation #6 setting instruction issued before and are received from the acquisition operation #6 setting instruction to the notification of the first threshold-exceeding data. When data collection corresponding to the acquisition operation #6 setting instruction is completed, the data collection completion is reported to the application 33. When a data request is issued after the data collection completion report, measurement data collected in accordance with the acquisition operation #6 setting instruction can be acquired.

The data collection operation from the sensor unit 25 and the data report operation to the application 33 have been described above while giving focus to one acquisition operation setting instruction issued to the measurement data processing part 35. Instead, a plurality of applications may simultaneously issue acquisition operation setting instructions to the measurement data processing part 35.

If the data collection conditions of the plurality of acquisition operation setting instructions include different data collection periods, data collection is done at a time interval corresponding to the greatest common divisor of the data collection periods in a period when the plurality of data collection conditions must be coped with. In data collection, the data collection part 37 executes monitoring of the data collection condition for each acquisition operation setting instruction. As data report to the application 33, the collection/report control part 36 and data report part 38 execute operations corresponding to each acquisition operation setting. With this arrangement, even when acquisition operation setting instructions are simultaneously issued to the measurement data processing part 35, the data collection operation and data report operation are appropriately performed, and the application can acquire desired measurement data.

Second Embodiment

The second embodiment of the present invention will be described next with reference to FIGS. 14 to 20. The same reference numerals as in the first embodiment denote the same or similar elements in the second embodiment, and a repetitive description thereof will be omitted.

A cellular phone device 10 according to this embodiment is different from the first embodiment in only the arrangement of software operating in a control unit 21.

The software to be executed by the control unit 21 of this embodiment includes (i) a basic processing part 31A which implements a speech communication function, mail function, and character input function, i.e., the basic functions of the cellular phone and controls the above-described various kinds of hardware resources, and (ii) an application 33A to provide various contents such as a game to the user.

The basic processing part 31A is different from the first embodiment only in that the basic processing part 31A comprises a measurement data processing part 35A in place of the measurement data processing part 35. The measurement data processing part 35A comprises (i) a collection/report control part 36A which processes commands from the application 33A and controls the measurement operation of a sensor unit 25 and the entire measurement data processing part 35A, and (ii) a data collection part 37A which collects measurement data in accordance with the collection period as a data collection condition designated by the application 33A and stores the measurement data in a temporary storage area 24 of a storage unit 23 described above. The measurement data processing part 35A also comprises (iii) a data report part 38A which reports, to the application 33A, measurement data that satisfies a data report condition designated by the parameter of a data request issued by the application 33A, and also reports, to the application 33A, the number of measurement data reportable to the application 33A of the measurement data stored in the temporary storage area 24.

Upon receiving a notification of a collection period, the data collection part 37A continues data collection until a collection operation end instruction. The data collection part 37A manages a start pointer to indicate the storage address of the oldest measurement data in the above-described temporary storage area 24 used as a ring buffer and an end pointer to indicate the storage address of measurement data to be stored next. Upon receiving a notification of a collection period, the data collection part 37A sets the start pointer value and end pointer value to the same value (e.g., the start address of the temporary storage area 24). The start pointer value and end pointer value can be referred to by the data report part 38A.

<Measurement Data Collection and Report Operation>

A measurement data collection operation and a measurement data report operation to the application 33A in this embodiment will be described next. Assume that the application 33A is already activated. Also assume that the application which uses the sensor unit 25 is only the application 33A, and no state wherein a plurality of data collection conditions are simultaneously set occurs.

(2-1) Acquisition of Latest Data During Data Collection (Acquisition Operation #7)

Figure 15:
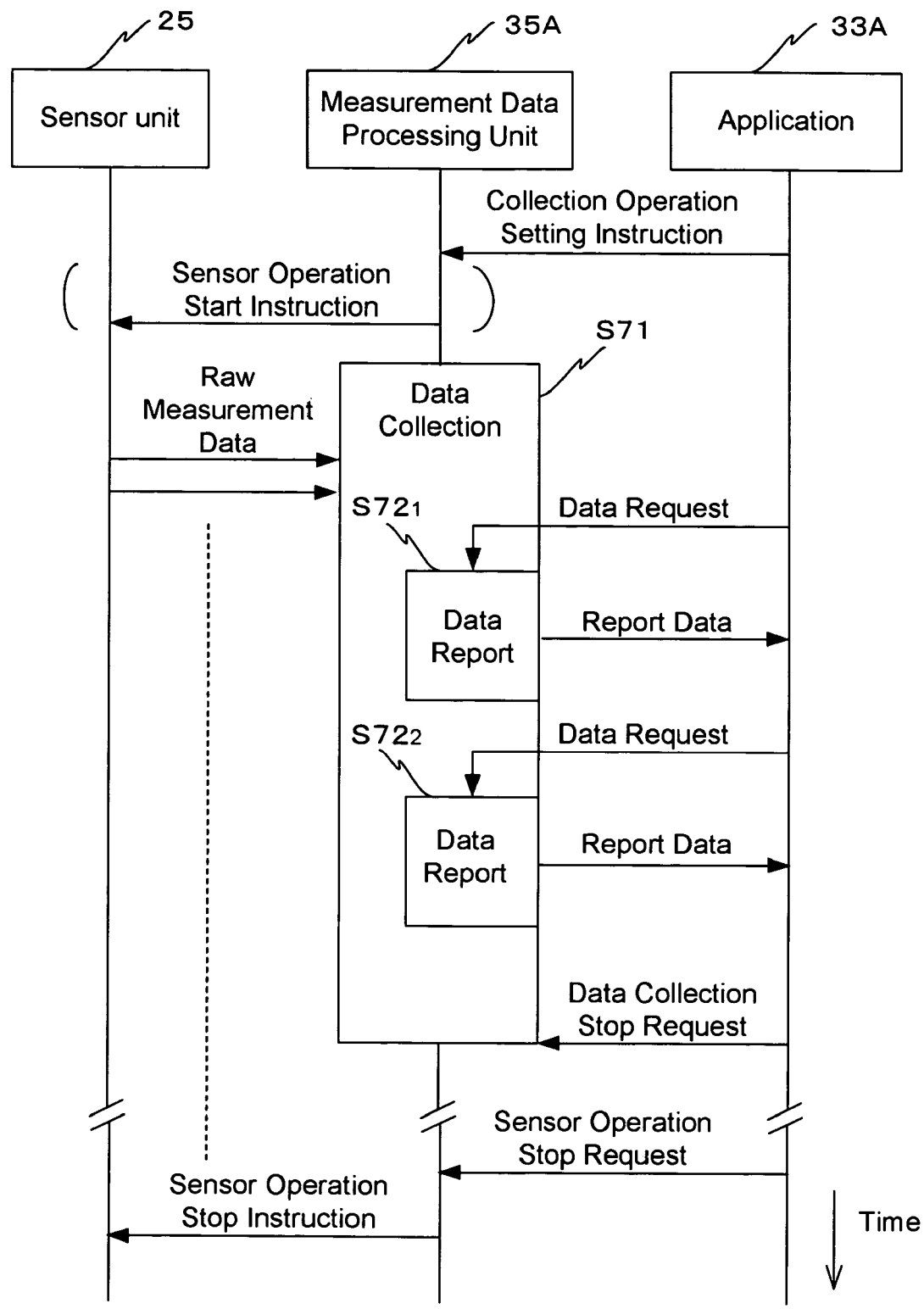
FIG. 15 is a sequence chart for explaining processing in acquisition operation #7.

In acquisition operation #7, as shown in FIG. 15, the application 33A sends, to the measurement data processing part 35A, a collection operation setting instruction containing a data collection period TP7 as a parameter. As the data collection period TP7, a natural number multiple of the periodical notification period of raw measurement data from the sensor unit 25 is designated, as in (1-2) described above.

With the collection operation setting instruction, the measurement data processing part 35A is notified that measurement data which satisfies the data collection condition includes measurement data obtained firstly by after the collection operation setting instruction and subsequent measurement data sequentially obtained at the data collection period TP7.

In the measurement data processing part 35A, the collection/report control part 36A receives and analyzes the collection operation setting instruction. The collection/report control part 36A determines whether the sensor unit 25 is operating, as in (1-1) described above, and executes processing corresponding to the determination result.

The collection/report control part 36A notifies the data collection part 37A of the data collection condition corresponding to acquisition operation #7. Upon receiving this notification, the data collection part 37A starts data collection processing in step S71.

Figure 16:
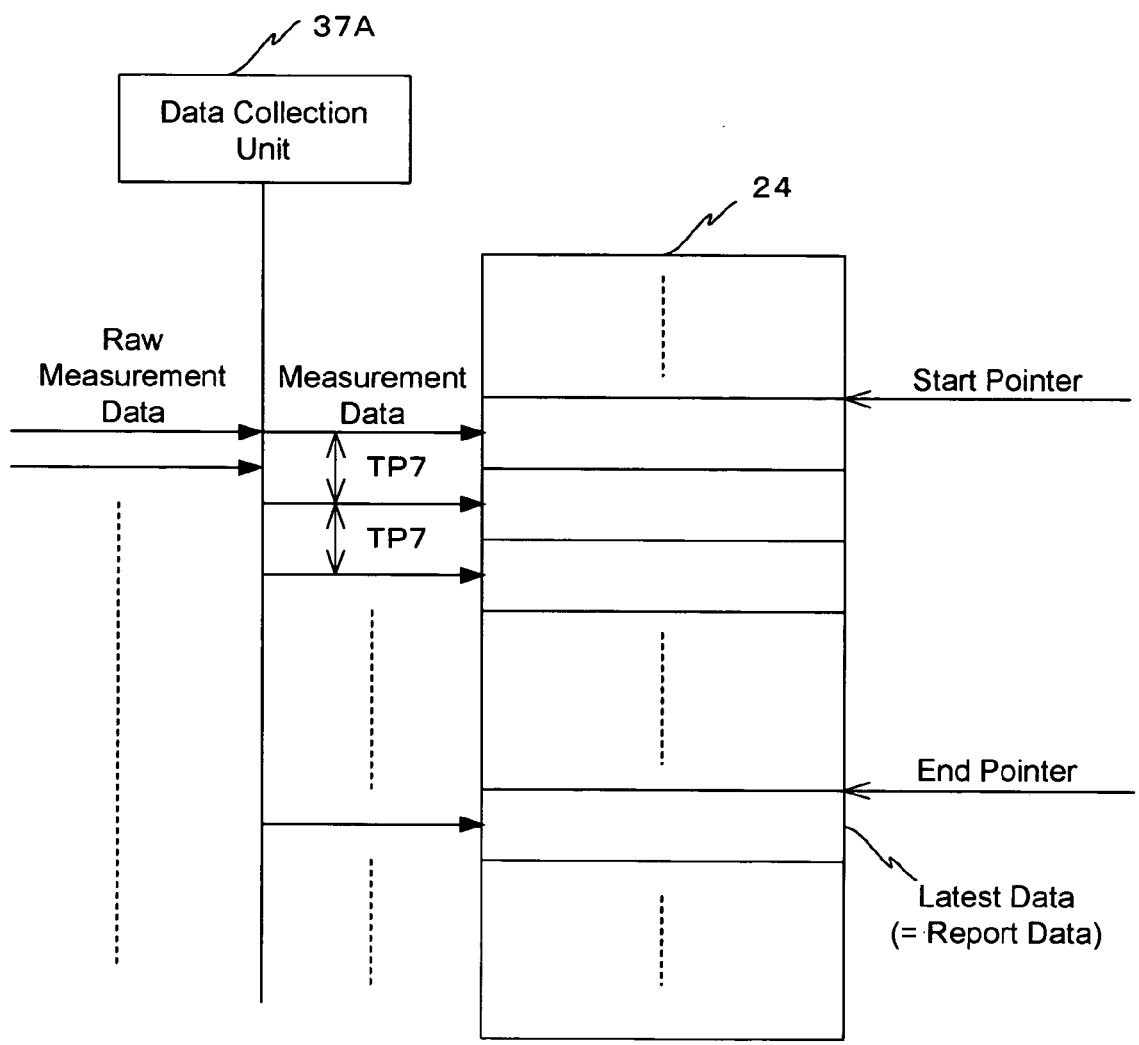
FIG. 16 is a view for explaining data collection in acquisition operation #7.

In step S71, upon receiving the first raw measurement data from the sensor unit 25, the data collection part 37A calculates measurement data corresponding to the first raw measurement data, as in (1-1) described above. The data collection part 37A stores the calculated measurement data in the temporary storage area 24. Every time raw measurement data is received from the sensor unit 25 at the period TP7, the data collection part 37A calculates measurement data corresponding to the raw measurement data and sequentially stores the measurement data in the temporary storage area 24. Every time measurement data is stored in the temporary storage area 24, the data collection part 37A updates the end pointer value (and the start pointer value as needed). FIG. 16 shows the data collection operation and the storage operation in the temporary storage area 24 by the data collection part 37A in step S71.

Referring back to FIG. 15, at a desired point of time during data collection by the data collection part 37A, the application 33A sends, to the measurement data processing part 35A, a data request to request report of the latest one of the measurement data stored in the temporary storage area 24 (to be referred to as a "data request of acquisition operation #7" hereinafter). In the measurement data processing part 35A, the collection/report control part 36A receives the data request of acquisition operation #7. The collection/report control part 36A notifies the data report part 38A that the data request of acquisition operation #7 is received. Upon receiving this notification, the data report part 38A starts data report processing in step S72.

In step S72, the data report part 38A refers to the end pointer value. Then, the data report part 38A reads out the latest measurement data from the temporary storage area 24 on the basis of the end pointer value. The data report part 38A reports the readout measurement data to the application 33A as report data. The data report part 38A notifies the collection/report control part 36A that data report is completed. The processing in step S72 is ended.

When the processing of acquisition operation #7 is executed in the above-described way, the application 33A can acquire the latest one of measurement data stored in the temporary storage area 24.

(2-2) First Batch Acquisition During Data Collection (Acquisition Operation #8)

Figure 17:
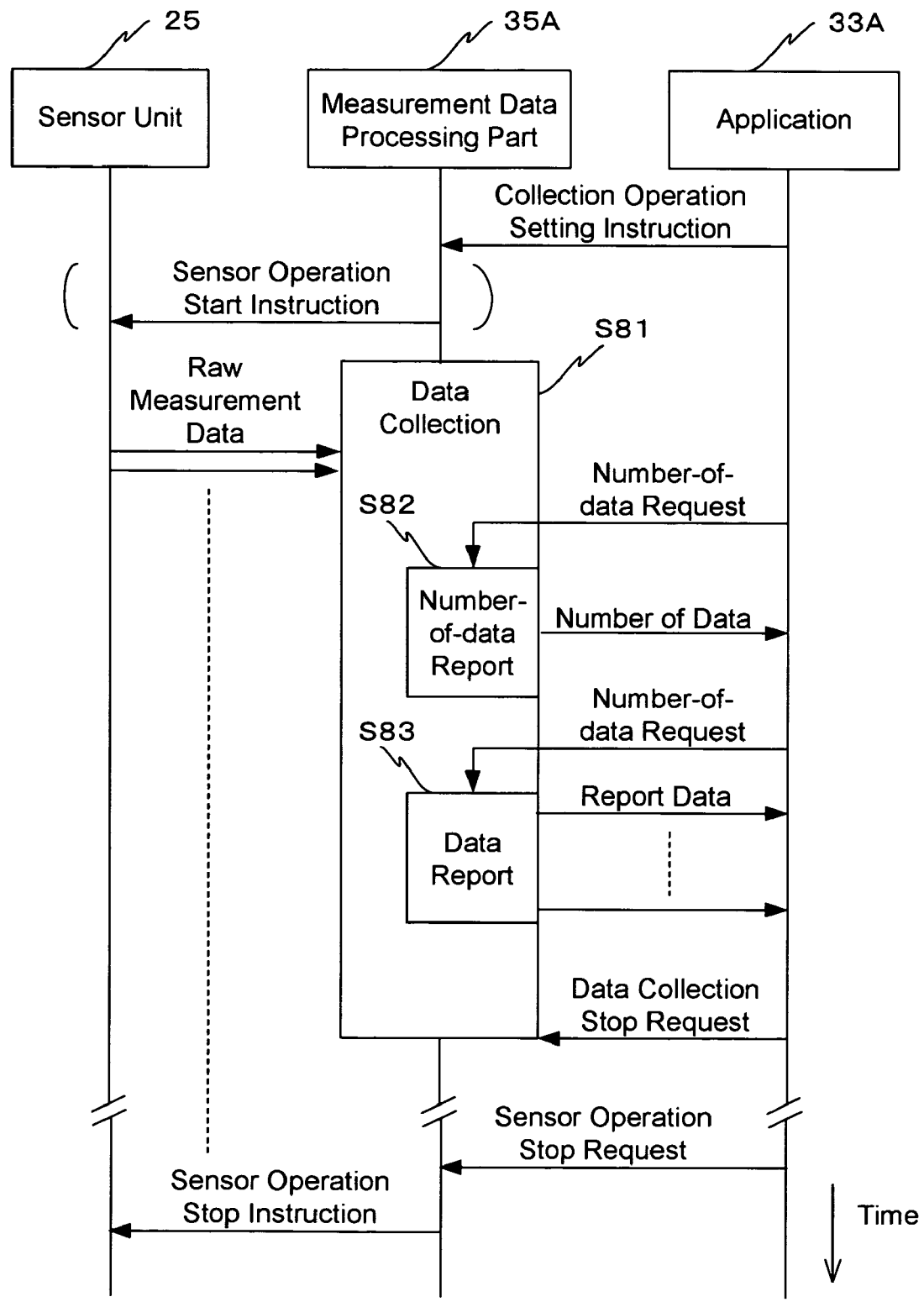
FIG. 17 is a sequence chart for explaining processing in acquisition operation #8.

In acquisition operation #8, as shown in FIG. 17, the application 33A sends, to the measurement data processing part 35A, a collection operation setting instruction containing a data collection period TP8 as a parameter. As the data collection period TP8, a natural number multiple of the periodical notification period of raw measurement data from the sensor unit 25 is designated, as in (1-2) described above.

With the collection operation setting instruction, the measurement data processing part 35A is notified that measurement data which satisfies the data collection condition includes measurement data obtained firstly by after the collection operation setting instruction and subsequent measurement data sequentially obtained at the data collection period TP8.

In the measurement data processing part 35A, the collection/report control part 36A receives the collection operation setting instruction. The collection/report control part 36A determines whether the sensor unit 25 is operating, as in (1-1) described above, and executes processing corresponding to the determination result.

Figure 18:
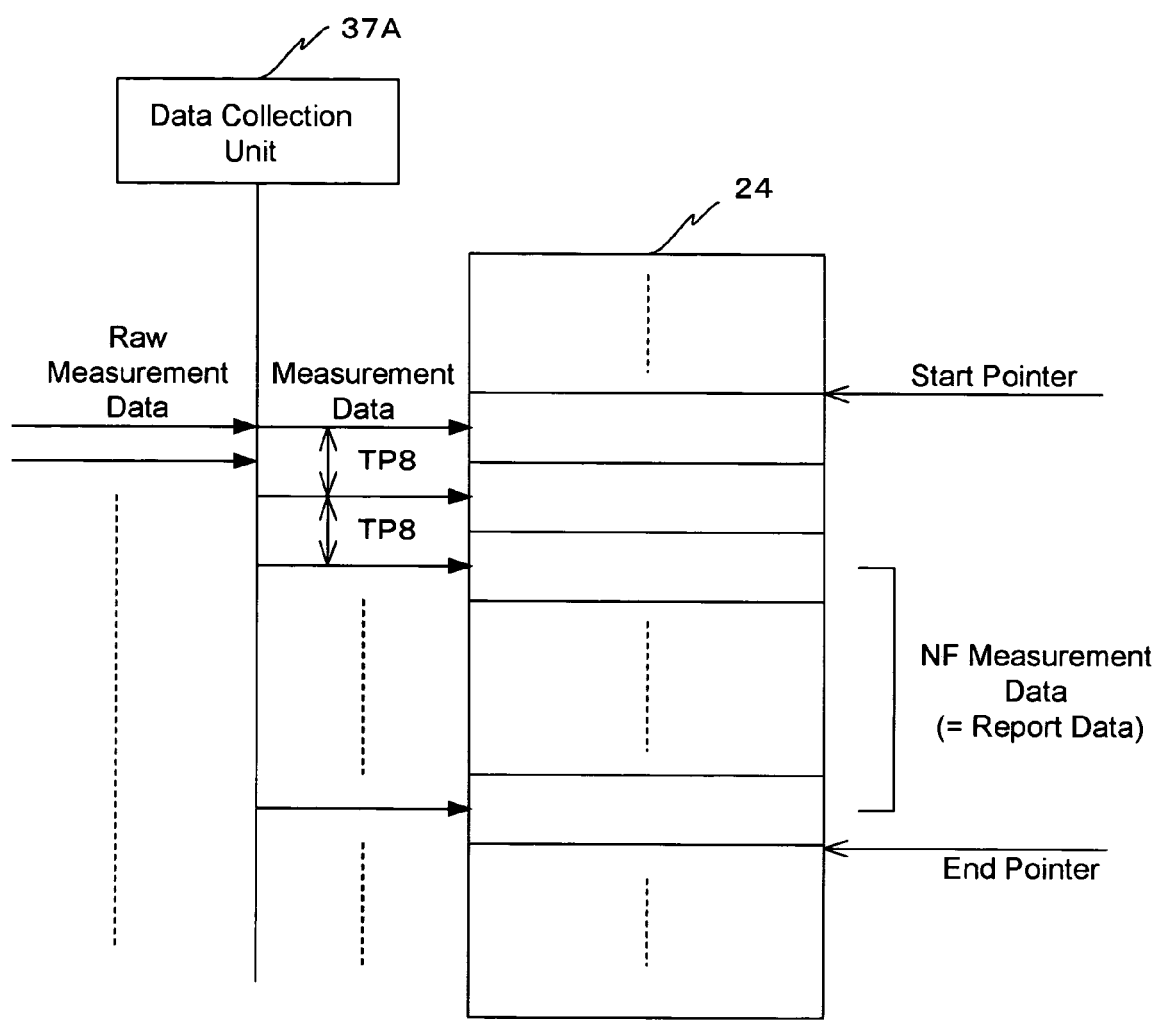
FIG. 18 is a view for explaining data collection in acquisition operation #8.

The collection/report control part 36A notifies the data collection part 37A of the data collection condition corresponding to acquisition operation #8. Upon receiving this notification, the data collection part 37A starts data collection processing in step S81. In step S81, the same processing as in step S71 in acquisition operation #7 described above is executed except that the data collection period is TP8. FIG. 18 shows the data collection operation and the storage operation in the temporary storage area 24 by the data collection part 37A in step S81.

Referring back to FIG. 17, at a desired point of time during data collection by the data collection part 37A, the application 33A sends, to the measurement data processing part 35A, a request to request the number of reportable data (to be referred to as the "number of reportable data" or simply as the "number of data" hereinafter) of the measurement data stored in the temporary storage area 24. In the measurement data processing part 35A, the collection/report control part 36A receives the request of the number of reportable data. The collection/report control part 36A notifies the data report part 38A that the request of the number of reportable data is received. Upon receiving this notification, the data report part 38A starts data number report processing in step S82.

In step S82, the data report part 38A refers to the start pointer value and end pointer value. The data report part 38A calculates the number of reportable data by using the start pointer value and end pointer value. The data report part 38A reports the calculated number of data to the application 33A. Upon receiving the report of the number of reportable data, the application 33A determines whether the number of reportable data has reached a desired number of data. If the determination result is negative, the application 33A repeatedly issues the request of the number of reportable data at a desired point of time and determines whether the number of reportable data at that point of time has reached a desired number NF of data until an affirmative determination result is obtained.

When it is confirmed that the number of reportable data has reached the desired number of data, the application 33A sends, to the measurement data processing part 35A, a data request of acquisition operation #8 containing the desired number NF of measurement data as a parameter. In accordance with the data request of acquisition operation #8, the measurement data processing part 35A is notified that the measurement data which satisfies the data report condition includes NF measurement data which are collected by the data collection part 37A before the point of time of data request issue in the latest time when viewed from the point of time of data request issue.

In the measurement data processing part 35A, the collection/report control part 36A receives the data request of acquisition operation #8. The collection/report control part 36A sends, to the data report part 38A, the number NF of measurement data and a notification representing that the data request of acquisition operation #8 is received. Upon receiving this notification, the data report part 38A starts data report processing in step S83.

In step S83, the data report part 38A refers to the end pointer value. The data report part 38A reports, to the application 33A, NF measurement data in the reverse chronological order (FIG. 18) from the latest measurement data as report data. The data report part 38A sets the start pointer value to the same value as the end pointer value and notifies the collection/report control part 36A that data report is completed. The processing in step S83 is ended.

When the processing of acquisition operation #8 is executed in the above-described way, the application 33A can acquire, of the measurement data stored in the temporary storage area 24, a desired number of measurement data acquired recently.

(2-3) Second Batch Acquisition During Data Collection (Acquisition Operation #9)

Figure 19:
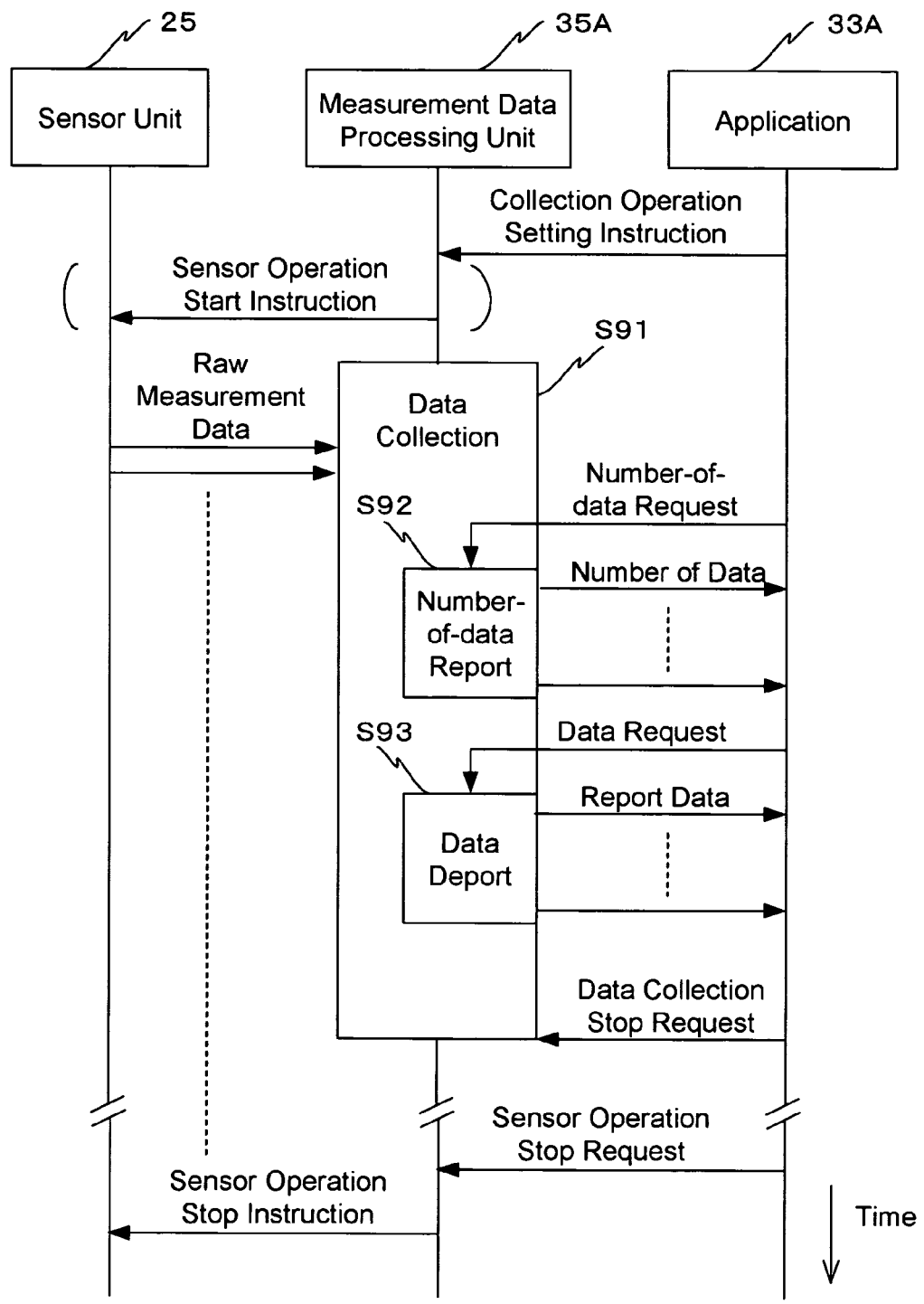
FIG. 19 is a sequence chart for explaining processing in acquisition operation #9.

In acquisition operation #9, as shown in FIG. 19, the application 33A sends, to the measurement data processing part 35A, a collection operation setting instruction containing a data collection period TP9 as a parameter. As the data collection period TP9, a natural number multiple of the periodical notification period of raw measurement data from the sensor unit 25 is designated, as in (1-2) described above. With the collection operation setting instruction, the measurement data processing part 35A is notified that measurement data which satisfies the data collection condition includes measurement data obtained firstly by after the collection operation setting instruction and subsequent measurement data sequentially obtained at the data collection period TP9. In the measurement data processing part 35A, the collection/report control part 36A receives the collection operation setting instruction. The collection/report control part 36A determines whether the sensor unit 25 is operating, as in (1-1) described above, and executes processing corresponding to the determination result.

Figure 20:
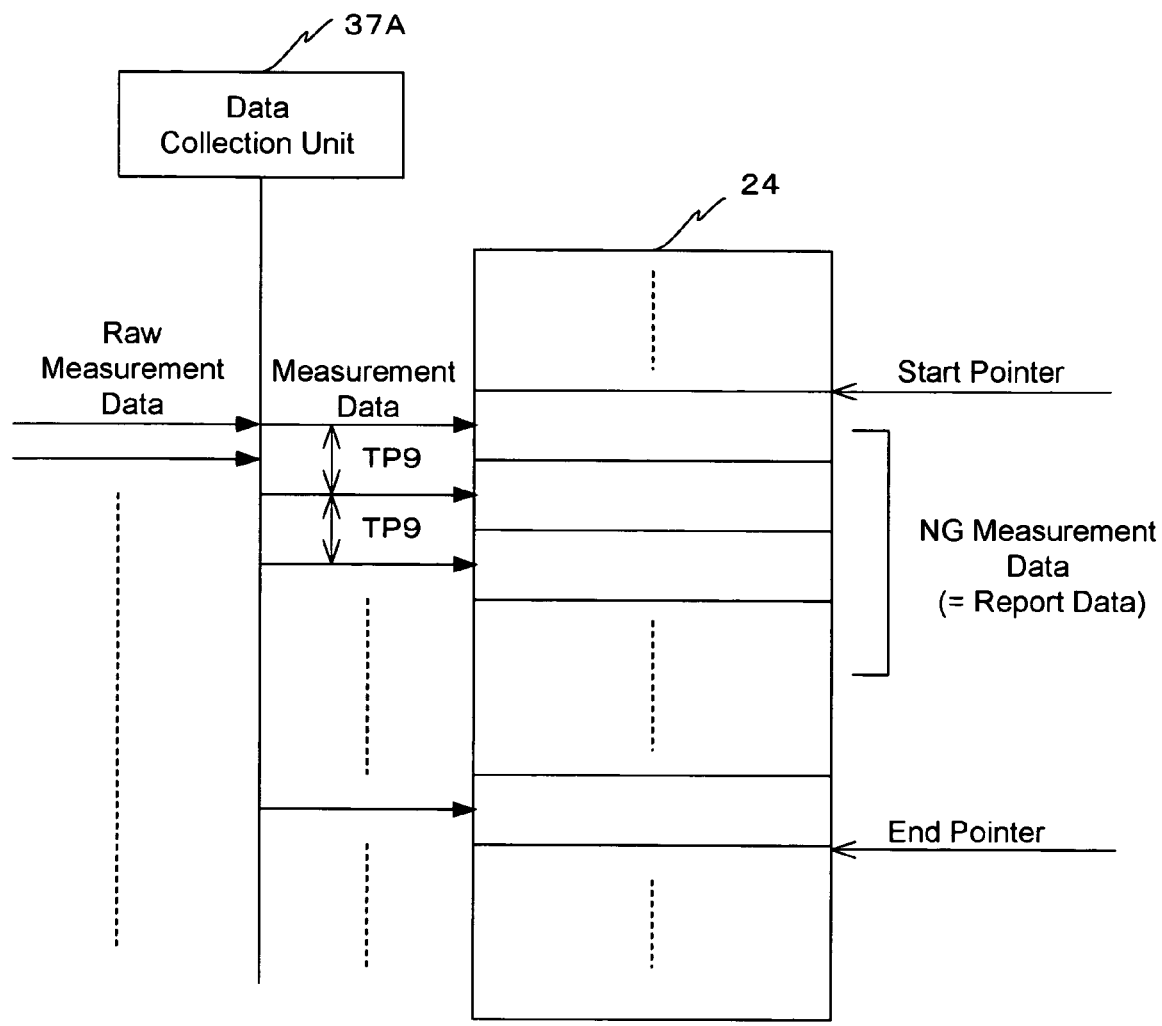
FIG. 20 is a view for explaining data collection in acquisition operation #9.

The collection/report control part 36A notifies the data collection part 37A of the data collection condition corresponding to acquisition operation #9. Upon receiving this notification, the data collection part 37A starts data collection processing in step S91. In step S91, the same processing as in step S71 in acquisition operation #7 described above is executed except that the data collection period is TP9. FIG. 20 shows the data collection operation and the storage operation in the temporary storage area 24 by the data collection part 37A in step S91.

Referring back to FIG. 19, at a desired point of time during data collection by the data collection part 37A, the application 33A sends, to the measurement data processing part 35A, a request to request the number of reportable data (to be referred to as the "number of reportable data" or simply as the "number of data" hereinafter) of the measurement data stored in the temporary storage area 24. In the measurement data processing part 35A, the collection/report control part 36A receives the request of the number of reportable data. The collection/report control part 36A notifies the data report part 38A that the request of the number of reportable data is received. Upon receiving this notification, the data report part 38A starts data number report processing in step S92. In step S92, the same processing as in step S82 in acquisition operation #8 described above is executed.

Upon receiving the report of the number of reportable data, the application 33A repeatedly determines whether the number of reportable data has reached a desired number NG of measurement data until an affirmative determination result is obtained.

When it is confirmed that the number of reportable data has reached the desired number of data, the application 33A sends, to the measurement data processing part 35A, a data request of acquisition operation #9 containing the desired number NG of data as a parameter. In accordance with the data request of acquisition operation #9, the measurement data processing part 35A is notified that the measurement data which satisfies the data report condition includes NG measurement data which are stored in the temporary storage area 24 in the chronological order.

In the measurement data processing part 35A, the collection/report control part 36A receives the data request of acquisition operation #9. The collection/report control part 36A sends, to the data report part 38A, the number NG of measurement data and a notification representing that the data request of acquisition operation #9 is received. Upon receiving this notification, the data report part 38A starts data report processing in step S93.

In step S93, the data report part 38A refers to the start pointer value. The data report part 38A reports, to the application 33A, NG measurement data in the chronological order (FIG. 20) from the measurement data at the address of the temporary storage area indicated by the start pointer value as report data. The data report part 38A sets the start pointer value to the storage address of the measurement data which is collected following to the latest one of the reported measurement data and notifies the collection/report control part 36A that data report is completed. The processing in step S93 is ended.

When the processing of acquisition operation #9 is executed in the above-described way, the application 33A can acquire, of the measurement data stored in the temporary storage area 24, a desired number of measurement data in the chronological order.

In the second embodiment, in acquisition operations #8 and #9, the application 33A designates the desired number of measurement data as a data report condition and issues a data request. As in acquisition operation #2 of the above-described first embodiment, a data request may be issued by designating a desired time interval as a data report condition in place of the desired number of data. In this case, the application 33A preferably counts the time from data collection condition setting or issue of the preceding data request instead of requesting the number of reportable data.

In acquisition operations #8 and #9, when the number of reportable data is smaller than the number of data designated by the data request, the data report part 38A can report, to the application 33A, error information representing that a shortage in reportable data. Alternatively, the data report part 38A may report all reportable data at the point of time of data request reception and information representing the number of reported measurement data.

As described above, in the first or second embodiments, the data collection part 37, 37A collects measurement data which satisfy a data collection condition designated by the application 33, 33A and stores the measurement data in the temporary storage area 24. The data report part 38, 38A notifies the application 33, 33A of data which is stored in the temporary storage area 24 and satisfies a data report condition. Hence, the application 33, 33A can acquire desired measurement data while reducing the load on the application 33, 33A.

Depending on the type of acquisition operation setting, after the collection/report control part 36, 36A receives a data request from the application 33, 33A, the data report part 38, 38A executes the data report operation. Hence, an environment to allow the application 33, 33A to acquire necessary measurement data when it is necessary can be provided to the application 33, 33A.

Depending on the type of acquisition operation setting, when storage of measurement data satisfying the data collection condition in the temporary storage area 24 is ended, the collection/report control part 36, 36A reports the data collection completion to the application 33, 33A. Hence, an environment to allow the application 33, 33A to recognize the data collection completion without monitoring the data collection completion can be provided. As a result, the application 33, 33A which has recognized the data collection completion by the data collection completion report can acquire necessary measurement data at a timing convenient for itself.

When an operation start instruction event or operation stop instruction event of the above-described sensor unit 25 has occurred, and the collection/report control part 36, 36A is notified of it, the collection/report control part 36, 36A sends a sensor operation start instruction or sensor operation stop instruction to the sensor unit 25. Hence, the sensor unit 25 can be used appropriately and reliably. In addition, power consumption by the operation of the sensor unit 25 can be suppressed.

In the first or second embodiments, the sensor unit 25 is mounted in the cellular phone device 10. Instead, the sensor unit 25 may be arranged outside the cellular phone device 10. The sensor unit 25 and cellular phone device 10 may be connected through an external device connection interface port (not shown) of the cellular phone device 10.

In the first or second embodiments, the sensor part 26 is a 5-axis sensor to detect the pitch angle $\theta_X$, roll angle $\theta_Y$, yaw angle $\theta_Z$, X-direction acceleration $\alpha_X$, and Y-direction acceleration $\alpha_Y$. Instead, the sensor part 26 may be a 6-axis sensor to additionally detect a Z-direction acceleration $\alpha_Z$. Alternatively, a sensor to detect a physical quantity except the attitude angle and acceleration may be used.

In the first or second embodiments, one application never issues a plurality of acquisition operation instructions to the measurement data processing part 35, 35A simultaneously. However, one application may issue a plurality of acquisition operation instructions to the measurement data processing part 35, 35A simultaneously. In this case, in addition to the application identifier, an acquisition operation instruction identifier must be added to the parameters of the acquisition operation instruction. The measurement data processing part 35, 35A must execute the data collection operation and data report operation corresponding to a combination of an application identifier and an acquisition operation instruction identifier.

In the first or second embodiments, as the sensor operation start instruction event, the operation start request of the sensor unit 25 by the application 33, 33A, activation of an application whose management information describes use of the sensor unit 25, a key operation to instruct the operation start of the sensor unit 25, voice input to instruct the operation start of the sensor unit 25, and arrival of time at which the sensor unit should start the operation are employed. Not all but only some of them may be employed as the sensor operation start instruction event. Arrival of a voice or mail message may be employed as the sensor operation start instruction event. In this case, an off-hook operation by the key operation executed after arrival can be executed by causing the cellular phone device 10 to execute a motion in a predetermined form in place of the key operation.

In the first or second embodiments, as the sensor operation stop instruction event, the operation stop request of the sensor unit 25 by the application 33, 33A, stop of an application whose management information describes use of the sensor unit 25, a key operation to instruct the operation stop of the sensor unit 25, voice input to instruct the operation stop of the sensor unit 25, and arrival of time at which the sensor unit should stop the operation are employed. Not all but only some of them may be employed as the sensor operation stop instruction event. Arrival of a voice or mail message may be employed as the sensor operation end instruction event. In this case, for example, when the sensor is not used in call reception processing, the operation of the sensor can be stopped before call reception processing with a high priority.

In the first or second embodiments, a so-called straight-type cellular phone device is used in which the positional relationship between the display unit 13 and the operation unit 12 with a key array is fixed. However, the present invention can also be applied to a so-called clamshell-type cellular phone device 10' in which a first portion 51 and a second portion 52 can relatively pivot about an axis AX1 serving as an axis of rotation so that the cellular phone device can be folded or unfolded, as shown in FIGS. 21A to 21C. In this case, the sensor unit 25 can be disposed either on the side of the first portion 51 or on the side of the second portion 52. For example, the folded state can be added as the sensor operation stop instruction event, and the unfolded state can be added as the sensor operation start instruction event.

The present invention can also be applied to a so-called 2-axis rotation-type cellular phone device 10" in which the second portion 52 includes a base portion 53 and a display unit storage unit 54, and the display unit storage unit 54 can rotate at least 180° about an axis AX2 serving as an axis of rotation with respect to the base portion 53, as shown in FIGS. 22A to 22C. Even in this case, the sensor unit 25 can be disposed either on the side of the first portion 51 or on the side of the second portion 52. For example, of shape changes which can be caused by rotation about the two axes AX1 and AX2, a shape change to make the display surface of the display unit 13 visible can be added as the sensor operation start instruction event, and a shape change to make the display surface of the display unit 13 invisible can be added as the sensor operation stop instruction event.

The present invention can also be applied to a cellular phone device capable of changing its shape, except a so-called clamshell-type cellular phone device, such as a so-called revolver-type cellular phone device in which the display unit side can rotate with respect to the operation unit side about an axis perpendicular to the key array surface of the operation unit or a so-called slide-type cellular phone device in which the display unit side slides with respect to the operation unit side. Even in this case, the sensor unit 25 can be disposed either on the operation unit side or on the display unit side.

In the so-called revolver-type cellular phone device, a shape change by pivot can be detected by a pivot detection means, and a predetermined pivot state can be added as the sensor operation start instruction event or sensor operation stop instruction event. In the so-called slide-type cellular phone device, a shape change by slide can be detected by a slide detection means, and a predetermined slide state can be added as the sensor operation start instruction event or sensor operation stop instruction event. In a cellular phone device of another type capable of changing the shape, a shape change can be detected by a shape detection means, and a predetermined shape can be added as the sensor operation start instruction event or sensor operation stop instruction event.

The same reference numerals as in the above-described embodiments denote the same or similar elements in FIGS. 21A to 21C and 22A to 22C, and a repetitive description thereof has been omitted. In the cellular phone device 10' shown in FIGS. 21A to 21C and the cellular phone device 10" shown in FIGS. 22A to 22C, the antenna 17 in the above-described embodiments is housed in the device.

The axial direction serving as the reference of measurement in the sensor unit 25 can be determined in correspondence with the location of the sensor unit 25 or the model of the cellular phone.

Even in acquisition operation #2 of the first embodiment, the application 33 may issue a request of the number of reportable data before a data request, as in acquisition operations #8 and #9 of the second embodiment.

In the first or second embodiments, the present invention is applied to a cellular phone device. However, the present invention can also be applied to any other portable information device such as a portable game device, car navigation device, or PDA (Personal Digital Assistance), as a matter of course.

As described above, the data collection method and device of the present invention can be applied to collection of measurement data from a sensor and notification of an application. The mobile terminal device of the present invention can be applied to a portable information device in which an application using measurement data from a sensor is executed.

What is claimed is:

1. A measurement data collection method, comprising the steps of:
    causing the application to designate a data collection condition as a condition of measurement data to be collected;
    collecting measurement data which satisfies the data collection condition and storing the measurement data in temporary storage means, the collection step further including steps of collecting measurement data corresponding to a measurement result from a sensor and notifying an application operating in a portable information device of the measurement data, the sensor being arranged in the portable information device and measuring attitude angles about three axial directions of the portable information device, which are perpendicular to each other, and accelerations in at least two of the three axial directions; and
    reporting, to the application, measurement data which is stored in the temporary storage means and satisfies a data report condition designated by the application as condition of measurement data to be reported to the application.

2. A measurement data collection method according to claim 1, further comprising the data request step of causing the application to issue a data request with the designated data report condition,
    wherein the data report step is executed in response to the data request.

3. A measurement data collection method according to claim 2, wherein the data collection condition is a collection period.

4. A measurement data collection method according to claim 3, wherein the data which satisfies the data report condition is measurement data which is stored latest in the temporary storage means before the data request.

5. A measurement data collection method according to claim 3, wherein the measurement data which satisfies the data report condition is measurement data equal in number to the number of report data designated by the application in a reverse chronological order from a point of time of the data request.

6. A measurement data collection method according to claim 5, further comprising the number-of-reportable-data notification step of notifying the application of the number of reportable data when a notification request of the number of reportable data including measurement data which are stored in the temporary storage means and exist in the temporary storage means is received from the application between a preceding point of time of the data request and a current point of time.

7. A measurement data collection method according to claim 3, wherein the measurement data which satisfies the data report condition includes, of reportable data which are measurement data stored in the temporary storage means later than measurement data reported in response to a preceding data request and existing in the temporary storage means, measurement data equal in number to the number of reportable data designated by the application in a chronological order from the oldest data.

8. A measurement data collection method according to claim 7, further comprising the number-of-reportable-data notification step of notifying the application of the number of reportable data when a notification request of the number of reportable data is received from the application.

9. A measurement data collection method according to claim 1, wherein in the condition designation step, the data report condition is further designated.

10. A measurement data collection method according to claim 9, wherein
    the measurement data which satisfies the data collection condition is measurement data which is notified from the sensor for the first time after designation of the data collection condition and the data report condition,
    the measurement data which satisfies the data report condition is measurement data which satisfies the data collection condition, and
    the data report step is executed immediately after the measurement data which satisfies the data collection condition is newly stored in the temporary storage means.

11. A measurement data collection method according to claim 9, wherein
    the data collection condition includes threshold information indicating a data value range which is a range of a value of measurement data to be collected and one of a collection time and the number of collection data after designation of the data collection condition,
    the measurement data which satisfies the data report condition is measurement data which satisfies the data collection condition, and
    in the data report step, every time the measurement data which satisfies the data collection condition is newly stored in the temporary storage means, the stored measurement data is immediately reported to the application.

12. A measurement data collection method according to claim 9, further comprising the data request step of causing the application to issue a data request,
    wherein the data report step is executed in response to the data request.

13. A measurement data collection method according to claim 12, wherein
    the data collection condition includes a collection period, and
    the measurement data which satisfies the data report condition is one of measurement data collected within a limit time in a reverse chronological order from a point of time of the data request and measurement data within the maximum number of report data in the reverse chronological order from the point of time of the data request.

14. A measurement data collection method according to claim 12, further comprising the number-of-reportable-data notification step of notifying the application of the number of reportable data when a notification request of the number of reportable data including measurement data which are stored in the temporary storage means and exist in the temporary storage means is received from the application between a preceding point of time of the data request and a current point of time.

15. A measurement data collection method according to claim 12, further comprising the data collection completion report step of reporting data collection completion to the application when storage of the measurement data which satisfies the data collection condition in the temporary storage means is finished,
wherein the application which has received the report of the data collection completion issues the data request in the data request step.

16. A measurement data collection method according to claim 15, wherein
the data collection condition includes a collection period, and one of a collection time and the number of collection data, and
the measurement data which satisfies the data report condition is measurement data which satisfies the data collection condition.

17. A measurement data collection method according to claim 15, wherein
the data collection condition includes a collection period, start threshold information indicating a range of a value of measurement data as a condition for a start of data collection, and one of a collection time and the number of collection data after designation of the data collection condition, and
the measurement data which satisfies the data report condition is measurement data which satisfies the data collection condition.

18. A measurement data collection method according to claim 15, wherein
the data collection condition includes a collection period and end threshold information indicating a range of a value of measurement data as a condition for an end of data collection, and
the measurement data which satisfies the data report condition is one of measurement data collected within a limit time in a reverse chronological order from a point of the end of data collection and measurement data within the maximum number of data in the reverse chronological order from the point of time of the end of data collection.

19. A measurement data collection method according to claim 1, wherein when a plurality of data collection conditions are designated, and data collection must be executed at a plurality of different collection periods, in the data collection step, the measurement data is stored in the temporary storage means at a time interval corresponding to a value of a greatest common divisor related to values of the plurality of data collection periods.

20. A measurement data collection method according to claim 1, wherein when the application is abnormally terminated during execution of the data collection step, a basic processing part to manage the application issues an instruction to stop execution of the data collection step.

21. A measurement data collection method according to claim 1, further comprising
the sensor operation start instruction event detection step of detecting occurrence of a sensor operation start instruction event to instruct a start of an operation of the sensor, and
the sensor operation start step of starting the operation of the sensor.

22. A measurement data collection method according to claim 21, wherein the sensor operation start instruction event includes at least one event selected from the group consisting of an operation start request of the sensor from the application, activation of the application, a key operation to instruct to start the operation start of the sensor, voice input to instruct to start the operation start of the sensor, arrival of time at which the sensor should start the operation, and detection of a state to make the sensor operate depending on the shape of the device in which the sensor is implemented.

23. A measurement data collection method according to claim 21, wherein
the portable information device is a mobile communication terminal device, and
the sensor operation start instruction event includes a call reception event.

24. A measurement data collection method according to claim 1, further comprising
the sensor operation stop instruction event detection step of detecting occurrence of a sensor operation stop instruction event to instruct a stop of an operation of the sensor, and
the sensor operation stop step of stopping the operation of the sensor.

25. A measurement data collection method according to claim 24, wherein the sensor operation stop instruction event includes at least one event selected from the group consisting of an operation stop request of the sensor from the application, stop of the application, a key operation to instruct to stop the operation stop of the sensor, voice input to instruct to stop the operation of the sensor, arrival of time at which the sensor should stop the operation, and detection of a state to make the sensor stop the operation depending the shape of the device in which the sensor is implemented.

26. A measurement data collection method according to claim 24, wherein
the portable information device is a mobile communication terminal device, and
the sensor operation stop instruction event includes a call reception event.

27. A portable information device comprising:
a sensor which measures attitude angles about three axial directions perpendicular to each other and accelerations in at least two of the three axial directions;
temporary storage means for temporarily storing measurement data;
data collection means for collecting measurement data which satisfies a data collection condition designated by an application as a condition of data to be collected in the measurement data from said sensor and storing the measurement data in said temporary storage means; and
data report means for notifying the application of the measurement data which is stored in said temporary storage means and satisfies a data report condition designated by the application.

28. A portable information device according to claim 27, wherein said data report means notifies the application of the data which is stored in said temporary storage means and satisfies the data report condition in response to a data request issued by the application.

29. A portable information device according to claim 27, further comprising sensor operation start means for starting an operation of said sensor when occurrence of a sensor operation start event to instruct a start of the operation of said sensor is detected.

30. A portable information device according to claim 27, further comprising sensor operation stop means for stopping an operation of said sensor when occurrence of a sensor operation stop event to instruct a stop of the operation of said sensor is detected.

31. A portable information device according to claim 27, further comprising a radio communication part to communicate with a base station of a mobile communication network.

32. The portable information device according to claim 27, further comprising a data request means for causing the application to issue a data request with a designated data report condition,
   wherein the data report means executes in response to the data request.

33. The portable information device according to claim 32, wherein the data collection condition is a collection period.

34. The portable information device according to claim 33, wherein the data which satisfies the data report condition is measurement data which is stored latest in the temporary storage means before the data request.

35. The portable information device according to claim 33, wherein the measurement data which satisfies the data report condition is measurement data equal in number to the number of report data designated by the application in a reverse chronological order from a point of time of the data request.

36. The portable information device according to claim 35, further comprising a number-of-reportable-data notification means for notifying the application of the number of reportable data when a notification request of the number of reportable data including measurement data which are stored in the temporary storage means and exist in the temporary storage means is received from the application between a preceding point of time of the data request and a current point of time.

37. The portable information device according to claim 33, wherein the measurement data which satisfies the data report condition includes reportable data which are measurement data stored in the temporary storage means later than measurement data reported in response to a preceding data request and existing in the temporary storage means, measurement data being equal in number to the number of reportable data designated by the application in a chronological order from the oldest data.

38. The portable information device according to claim 37, further comprising a number-of-reportable-data notification means for notifying the application of the number of reportable data when a notification request of the number of reportable data is received from the application.

39. The portable information device according to claim 27, wherein the data report condition is further designated.

40. The portable information device according to claim 39, wherein:
   the measurement data which satisfies the data collection condition is measurement data which is notified from the sensor for the first time after designation of the data collection condition and the data report condition,
   the measurement data which satisfies the data report condition is measurement data which satisfies the data collection condition, and
   the data report means is executed immediately after the measurement data which satisfies the data collection condition is newly stored in the temporary storage means.

41. The portable information device according to claim 39, wherein:
   the data collection condition includes threshold information indicating a data value range which is a range of a value of measurement data to be collected and one of a collection time and the number of collection data after designation of the data collection condition,
   the measurement data which satisfies the data report condition is measurement data which satisfies the data collection condition, and
   in the data report step, every time the measurement data which satisfies the data collection condition is newly stored in the temporary storage means, the stored measurement data is immediately reported to the application.

42. The portable information device according to claim 39, further comprising a data request means for causing the application to issue a data request,
   wherein the data report means is executed in response to the data request.

43. The portable information device according to claim 42, wherein
   the data collection condition includes a collection period, and
   the measurement data which satisfies the data report condition is one of measurement data collected within a limit time in a reverse chronological order from a point of time of the data request and measurement data within the maximum number of report data in the reverse chronological order from the point of time of the data request.

44. The portable information device according to claim 42, further comprising a number-of-reportable-data notification step for notifying the application of the number of reportable data when a notification request of the number of reportable data including measurement data which are stored in the temporary storage means and exist in the temporary storage means is received from the application between a preceding point of time of the data request and a current point of time.

45. The portable information device according to claim 42, further comprising a data collection completion report means for reporting data collection completion to the application when storage of the measurement data which satisfies the data collection condition in the temporary storage means is finished,
   wherein the application which has received the report of the data collection completion issues the data request in the data request means.

46. The portable information device according to claim 45, wherein
   the data collection condition includes a collection period, and one of a collection time and the number of collection data, and
   the measurement data which satisfies the data report condition is measurement data which satisfies the data collection condition.

47. The portable information device according to claim 45, wherein
   the data collection condition includes a collection period, start threshold information indicating a range of a value of measurement data as a condition for a start of data collection, and one of a collection time and the number of collection data after designation of the data collection condition, and
   the measurement data which satisfies the data report condition is measurement data which satisfies the data collection condition.

48. The portable information device according to claim 45, wherein
   the data collection condition includes a collection period and end threshold information indicating a range of a value of measurement data as a condition for an end of data collection, and
   the measurement data which satisfies the data report condition is one of measurement data collected within a limit time in a reverse chronological order from a point of the end of data collection and measurement data within the maximum number of data in the reverse chronological order from the point of time of the end of data collection.

49. The portable information device according to claim 27, wherein when a plurality of data collection conditions are designated, and data collection must be executed at a plurality of different collection periods, in the data collection means, the measurement data is stored in the temporary storage means at a time interval corresponding to a value of a greatest common divisor related to values of the plurality of data collection periods.

50. The portable information device according to claim 27, wherein when the application is abnormally terminated during execution of the data collection means, a basic processing part to manage the application issues an instruction to stop execution of the data collection means.

51. The portable information device according to claim 27, further comprising
- a sensor operation start instruction event detection means for detecting occurrence of a sensor operation start instruction event to instruct a start of an operation of the sensor, and
- a sensor operation start means for starting the operation of the sensor.

52. The portable information device according to claim 51, wherein the sensor operation start instruction event includes at least one event selected from the group consisting of an operation start request of the sensor from the application, activation of the application, a key operation to instruct to start the operation start of the sensor, voice input to instruct to start the operation start of the sensor, arrival of time at which the sensor should start the operation, and detection of a state to make the sensor operate depending on the shape of the device in which the sensor is implemented.

53. The portable information device according to claim 51, wherein
- the portable information device is a mobile communication terminal device, and
- the sensor operation start instruction event includes a call reception event.

54. The portable information device according to claim 27, further comprising:
- a sensor operation stop instruction event detection means for detecting occurrence of a sensor operation stop instruction event to instruct a stop of an operation of the sensor, and
- a sensor operation stop means for stopping the operation of the sensor.

55. The portable information device according to claim 54, wherein the sensor operation stop instruction event includes at least one event selected from the group consisting of an operation stop request of the sensor from the application, stop of the application, a key operation to instruct to stop the operation stop of the sensor, voice input to instruct to stop the operation of the sensor, arrival of time at which the sensor should stop the operation, and detection of a state to make the sensor stop the operation depending the shape of the device in which the sensor is implemented.

56. The portable information device according to claim 54, wherein the portable information device is a mobile communication terminal device, and the sensor operation stop instruction event includes a call reception event.

* * * * *

UNITED STATES PATENT AND TRADEMARK OFFICE
CERTIFICATE OF CORRECTION

| | |
|---|---|
| PATENT NO. | : 7,469,197 B2 |
| APPLICATION NO. | : 11/654686 |
| DATED | : December 23, 2008 |
| INVENTOR(S) | : Daisuke Tsujino et al. |

It is certified that error appears in the above-identified patent and that said Letters Patent is hereby corrected as shown below:

On the Title page:

Item "(73)" Vodafone K.K., Tokyo, Japan"

Should read:

Item "(73)" --VODAFONE GROUP PLC, BERKSHIRE, UNITED KINGDOM--

Signed and Sealed this

Twenty-fifth Day of August, 2009

David J. Kappos
*Director of the United States Patent and Trademark Office*